United States Patent
Regev et al.

(10) Patent No.: US 10,435,904 B2
(45) Date of Patent: Oct. 8, 2019

(54) POOL CLEANING ROBOT HAVING A FILTERING UNIT AND A SENSOR

(71) Applicant: Maytronics Ltd., Kibbutz Yizrael (IL)

(72) Inventors: Ofer Regev, Tel-Adashim (IL); Nicholas Phillpot, Gan Nir (IL); Yair Hadari, Kibbutz Hulata (IL); Shay Witelson, Kibbutz Yizrael (IL)

(73) Assignee: Maytronics Ltd., Kibutz Yizrael (IL)

( * ) Notice: Subject to any disclaimer, the term of this patent is extended or adjusted under 35 U.S.C. 154(b) by 36 days.

(21) Appl. No.: 15/801,631

(22) Filed: Nov. 2, 2017

(65) Prior Publication Data

US 2018/0100321 A1   Apr. 12, 2018

Related U.S. Application Data

(63) Continuation-in-part of application No. 15/231,431, filed on Aug. 8, 2016, now Pat. No. 10,260,248, which is a continuation of application No. 15/089,606, filed on Apr. 4, 2016, which is a
(Continued)

(51) Int. Cl.
| | |
|---|---|
| *E04H 4/16* | (2006.01) |
| *B62D 55/26* | (2006.01) |
| *H02J 7/02* | (2016.01) |
| *B66B 9/00* | (2006.01) |
| *B62D 55/06* | (2006.01) |
| *B62D 55/07* | (2006.01) |
| *B66C 23/46* | (2006.01) |
| *H02J 50/00* | (2016.01) |
| *H02J 7/00* | (2006.01) |
| *B62D 55/265* | (2006.01) |
| *B62D 55/065* | (2006.01) |

(Continued)

(52) U.S. Cl.
CPC ......... *E04H 4/1654* (2013.01); *B62D 55/065* (2013.01); *B62D 55/0655* (2013.01); *B62D 55/075* (2013.01); *B62D 55/265* (2013.01); *B66B 9/00* (2013.01); *B66C 23/46* (2013.01); *H02J 7/02* (2013.01); *H02J 50/00* (2016.02); *A47L 2201/00* (2013.01); *H02J 7/0013* (2013.01); *H02J 7/0042* (2013.01); *H02J 7/025* (2013.01); *H02J 50/10* (2016.02)

(58) Field of Classification Search
CPC .............. E04H 4/1654; B62D 55/0655; B62D 55/075; B62D 55/065; B62D 55/265; B66C 23/46; B66B 9/00; A47L 2201/00; H02J 7/025; H02J 50/00; H02J 7/02; H02J 7/0013; H02J 50/10; H02J 7/0042
USPC ........... 210/143, 167.16, 167.17, 416.2, 739; 15/1.7
See application file for complete search history.

(56) References Cited

U.S. PATENT DOCUMENTS

| | | |
|---|---|---|
| 6,965,814 B2 | 11/2005 | Hadari |
| 9,133,639 B2 | 9/2015 | Ben-Dov et al. |
| 2004/0260428 A1 | 12/2004 | Hadari |

(Continued)

*Primary Examiner* — Fred Prince
(74) *Attorney, Agent, or Firm* — Reches Patents

(57) ABSTRACT

A pool cleaning robot that may include a filtering unit for filtering fluid that passes through the filtering unit; a calorimetric sensor for sensing a cleanliness related parameter of the filtering unit while the pool cleaning robot is submerged in the fluid; and a controller that is configured to at least assist in determining, based on the cleanliness related parameter of the filtering unit, a cleanliness of the filtering unit.

20 Claims, 40 Drawing Sheets

Related U.S. Application Data continuation of application No. 14/501,098, filed on Sep. 30, 2014, now Pat. No. 9,920,545.

(60) Provisional application No. 62/416,710, filed on Nov. 3, 2016, provisional application No. 61/890,260, filed on Oct. 13, 2013.

(51) Int. Cl.
  *B62D 55/075* (2006.01)
  *H02J 50/10* (2016.01)

(56) References Cited

U.S. PATENT DOCUMENTS

| | | | |
|---|---|---|---|
| 2009/0282627 A1 | 11/2009 | Porat | |
| 2013/0152970 A1* | 6/2013 | Porat | E04H 4/1654 134/18 |
| 2015/0101135 A1* | 4/2015 | Witelson | B66B 9/00 15/1.7 |
| 2015/0292222 A1* | 10/2015 | Tamar | H02K 7/1823 210/767 |
| 2016/0305144 A1 | 10/2016 | Maggeni | |

\* cited by examiner

POOL CLEANING ROBOT HAVING A FILTERING UNIT AND A SENSOR

CROSS REFERENCE

This patent application claims priority from U.S. provisional patent Ser. No. 61/416,710 filing date Nov. 3, 2016 which is incorporated herein by reference.

This patent application is a continuation in part of U.S. patent application Ser. No. 15/231,431 filing date Aug. 8, 2016 which is incorporated herein by reference.

BACKGROUND

Most assessments concerning the status of a filtering unit of a pool cleaning robot may be conducted manually by visual inspection. Reduction of pumping force or pumping abilities may be another indication for a clogged filtering unit.

A clogged filter indication system is described in U.S. Pat. No. 6,965,814 that is incorporated into this specification in its entirety. In brief, the said indication system concerns an electronic system that controls the electric power consumption and load of the pump motor for eventually producing an indication signal when the filtering unit is clogged or full.

It remains an important necessity for a pool owner or operator to receive real time information on the status of the filter.

SUMMARY

A pool cleaning robot, and a method for operating a pool cleaning robot as illustrated in the specification and/or the claims and/or the drawings.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
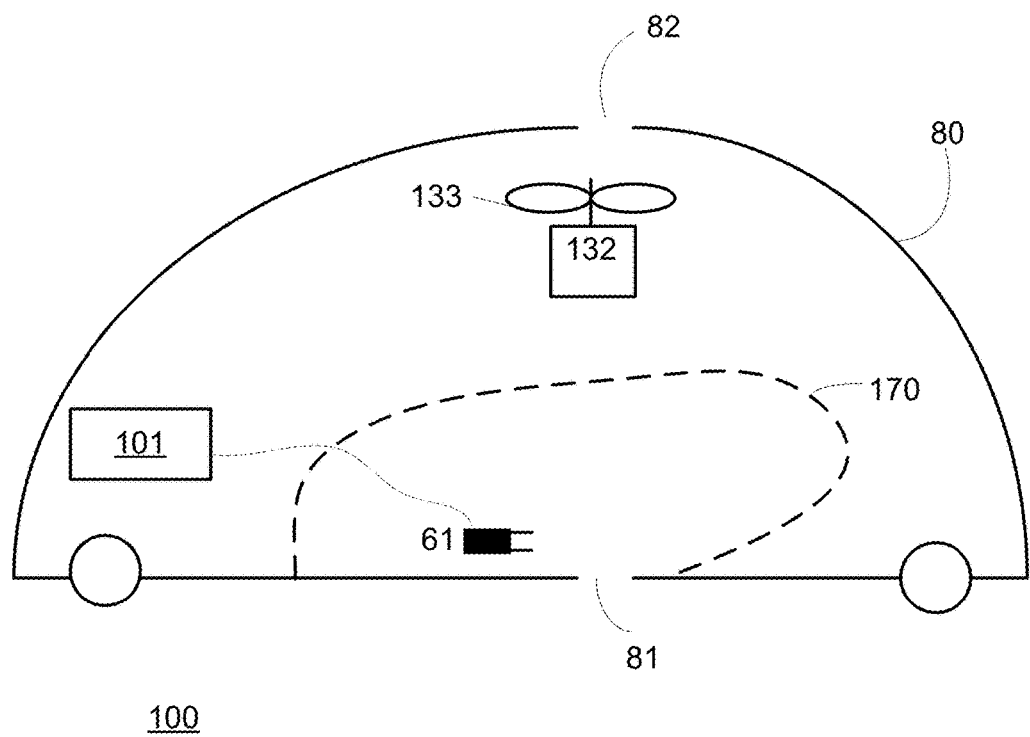
FIG. 1 is an example of a pool cleaning robot.

Any reference to a pool cleaner should be applied, mutatis mutandis to a method that is executed by a pool cleaner and/or to a non-transitory computer readable medium that stores instructions that once executed by the pool cleaner will cause the pool cleaner to execute the method.

Any reference to method should be applied, mutatis mutandis to a pool cleaner that is configured to execute the method and/or to a non-transitory computer readable medium that stores instructions that once executed by the pool cleaner will cause the pool cleaner to execute the method.

Any reference to a non-transitory computer readable medium should be applied, mutatis mutandis to a method that is executed by a pool cleaner and/or a pool cleaner that is configured to execute the instructions stored in the non-transitory computer readable medium.

The term "and/or" is additionally or alternatively.

There may be provided a pool cleaning robot that may have a filtering unit and one or more calorimetric sensors for sensing the flow of fluid (or the lack of flow of fluid) within the pool cleaning robot, wherein the flow of fluid (or the lack of flow) are indicative of the cleanliness of the filtering unit.

A mapping between detection signals of the calorimetric sensor and the cleaning sensor may be received and/or learnt in order to convert detection signals provided by a calorimetric sensor to an indication about the cleanliness of the filtering unit.

When the filtering unit becomes clogged with dirt (conveyed by the unfiltered fluid) the flow of fluid within the pool cleaning robot may decrease.

A filter may be regarded as clogged when the flow through the filter reduces (in comparison to a flow through an ideally clean filter) to a certain degree. For example—the flow may reduce by 5-100%—and especially above any threshold that may be defined by any party—including the pool cleaning robot manufacturer, a technician, a user, and the like. The threshold may be fixed or may change over time.

The pool cleaning robot may include more than a single calorimetric sensor for providing indications about the flow of fluid within different locations within the pool cleaning robot. These detection signals may provide more accurate information about the cleanliness of the filtering unit.

Non-limiting example of locations of the calorimetric sensor may include (i) at a location that precedes the filtering unit ("precedes"—non-filter fluid interacts with the calorimetric sensor before entering the filtering unit), (ii) within the filtering unit, (iii) after the filtering unit ("after"—the calorimetric sensor interacts with filtered fluid), and the like.

The calorimetric sensor may be positioned anywhere within the pool cleaning robot and/or partially or fully extending outside the pool cleaning robot.

The filtering unit may include multiple filters and one or more calorimetric sensors may precede and/or follow each one of the one or more of the multiple filters.

A calorimetric sensor may include a pair of thermal resistors that are spaced apart from each other. The thermal resistors are positioned within a path of the fluid. One thermal resistor is heated in a controlled manner (for example—to a known temperature) and the other thermal resistor is used for temperature readings. The calorimetric sensor may be an off-the-shelf calorimetric sensor of vendors such as Turck GmbH & Co. Mulheim an der Ruhr, or Vishay Inc., PA. USA, and the like.

It should be noted that instead of having two thermal resistors the calorimetric sensor may include more than a pair of thermal resistors, wherein one or more thermal resistors is heated while one or more other thermal resistors are used for the temperature reading.

An array of calorimetric sensors may be used. The selection of which thermal resistor is heated and which thermal resistor is used for temperature readings may change over time or may remain fixed.

The monitored filtering unit may have any shape, size and/or configuration. The filtering unit may be a bag, may include filtering sheets, may be a filtering cartridge, and the like. In the following text and/or figures there may be some example of the filtering unit—but these filtering units (bags, cartridges) are merely examples of a filtering unit.

Example of Operation

The thermal resistors of the calorimetric sensor are thermally isolated from each other—unless they are thermally coupled by fluid that contacts both thermal resistors.

When both thermal resistors of the calorimetric sensor are not contacted by fluid—and one thermal resistor is heated to a predefined temperature—there is a substantially constant temperature difference between the two thermal resistors.

Various figures illustrate the calorimetric sensors as having two legs that extend from a box—these legs the end points of the two thermal resistors.

When the fluid starts to flow (and contacts both thermal resistors)—the heat from the heated thermal resistor is drawn by the fluid and the temperature difference between the two thermal resistors is reduced.

The temperature difference depends on the flow of fluid—stronger flow dissipates more heat and the temperature difference is lower.

The differences measured by the thermal sensor reflects the changes in the flow rate of the fluid at the location of the calorimetric sensor. The temperature mapping may be converted by a controller to an indication about the cleanliness of the filtering unit. Cleaner filtering unit will result in faster fluid flow.

Fluid is induced to pass through the pool cleaning robot by a fluid control module that may include, for example, one or more motors and/or one or more pumps and/or one or more impellers.

The flow of the fluid may depend on the cleanliness of the filtering unit and on the manner in which the fluid is induced to flow (by the fluid control module). For example—the fluid may be sucked at different rates.

Accordingly—the manner in which the fluid control module operates as well as the readings from the calorimetric sensor should be taken into account when determining the cleanliness of the filtering unit.

The manner in which the fluid control module can be determined by control signals sent to the fluid control module, by the power consumption of the fluid control module, and the like.

A difference between the expected flow of the fluid (given the manner the fluid control module operates) and the measured flow (by the calorimetric sensor) may provide an indication about the cleanliness of the filtering unit.

A pool cleaning robot may include an accelerometer. This pool cleaning robot may or may not have one or more calorimetric sensors.

An accelerometer may be used for measuring the acceleration on different axis and helping with the pool cleaning robot navigation. Additionally or alternatively—the accelerator may be used to monitor the status of the filter. An accelerometer may be used instead of a calorimetric sensor or in addition to the calorimetric sensor.

The accelerator may be used for evaluating the cleanliness of the filtering unit—by measuring a frequency of noise being generated by the robot motoric systems and flow of fluid through the filter. The frequency of the noise vibrations captured by the accelerometer is changed according to the flow of the water inside the pool cleaning robot. The flow inside the pool cleaning robot is changed with the load of dirt in the filter element as the flowing or exiting water is searching for different directions to flow through.

That frequency and amplitude will be measured and compared between clean and full filtering bag or element and can be used as the source of indication to the control system.

The accelerometer may detect flow induced vibration. An accelerometer measuring the vibration of the pool cleaner body caused by the impeller motor may transform, from the time series noise measurements, to a frequency domain using standard FFT transformation (Fast Fourier Transform) to better recognize the noise frequency differences between high flow and low flow of water through the robot housing and filtering element or bag.

Any of the mentioned above pool cleaning robots may include a housing, a controller, a communications module, a fluid control module a drive mechanism to set in motion wheels and/or tracks and/or cleaning brushes for propelling the robot along the floor and/or walls of the swimming pool. The pool cleaning robot may also include an active auxiliary brush, a power supply, a power source such as a turbine and/or a tethered electrical cable connecting the power supply to the pool cleaning robot or, alternatively, on board rechargeable batteries.

The communications module may be used to send (and/or receive) messages via wires or wirelessly from an external communication devices that may be stationary inside or external to the pool, or mobile devices such as a smartphone or computer all having capacity to process received data concerning filtering unit of the pool cleaning robot and to deduct necessary actions needed to rectify a clogging or clogged filter bag or cartridge.

FIG. 1 is a cross sectional view of an example of of a pool cleaning robot 100 that has housing 80, opening 81 that may be located at the bottom of the pool cleaner, in close proximity of the swimming pool floor or wall surfaces, pump motor 132, impeller 133 that is rotated by pump motor 132 and causes a suction of the fluid and jet of fluid to be ejected from an opening 82, filtering unit 170 such as a filter element (bag or cartridge) that is positioned between the opening and the impeller, calorimetric sensor 61, and controller 101. Although elements 61,101,132,133 are depicted separately, these elements along with other elements such as, drive motors and additional sensors, may be assembled together inside a hermetically sealed, single motor unit (not shown).

Controller 101 may control the pool cleaning robot and may receive detection signals from the calorimetric sensor. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 2A:
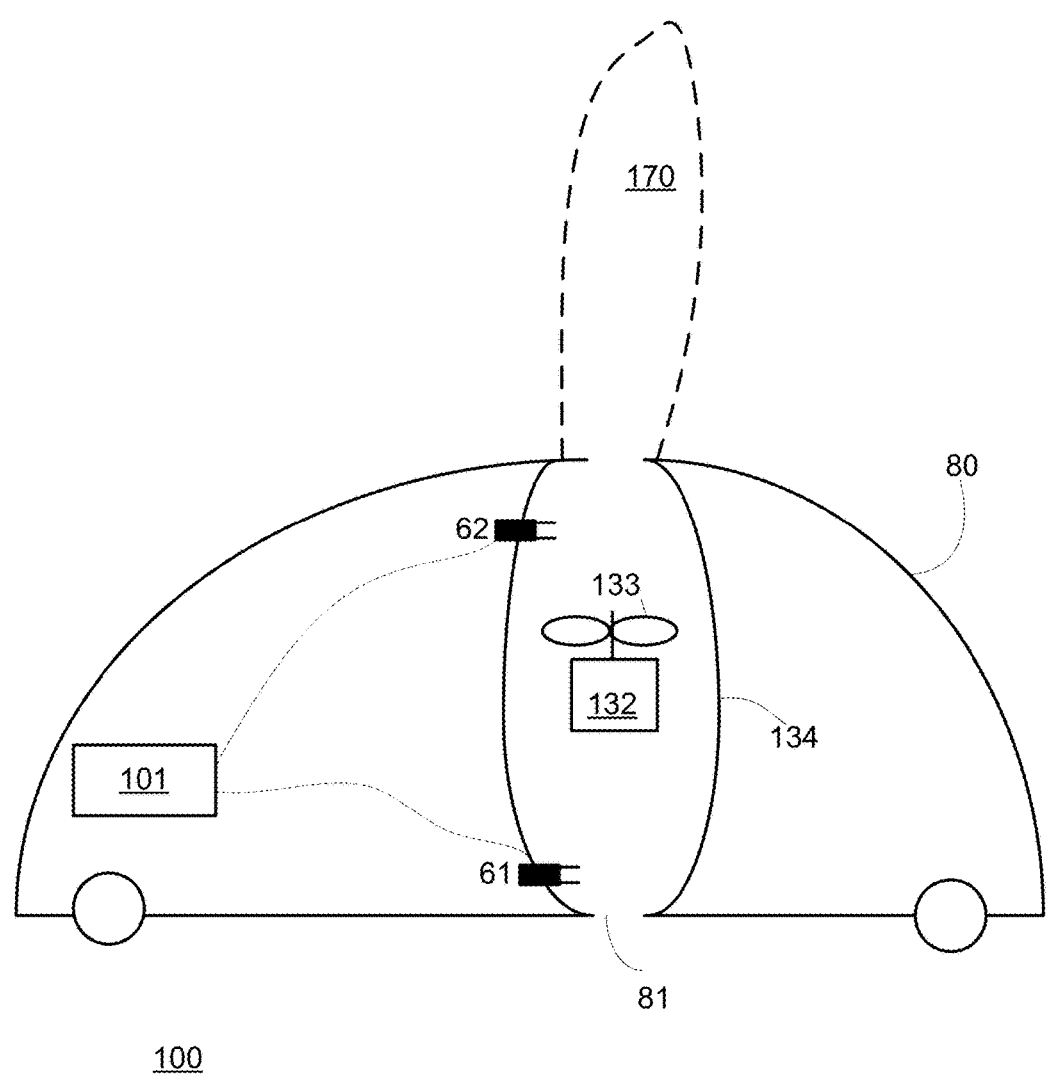
FIGS. 2A, 2B and 2C are examples of pool cleaning robots.

FIG. 2A is a cross sectional view of an example of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an external filter element (bag or cartridge) that is positioned outside housing 80, fluid flow boundaries 134 that define the fluid path between opening 81 and the filtering unit 170, calorimetric sensor 61 that is positioned near the opening 81 (and within the fluid path), another calorimetric sensor 62 that is positioned near the inlet of filtering unit 170, and controller 101.

Controller 101 may control the pool cleaning robot and may receive detection signals from calorimetric sensors 61 and 62. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 2B:
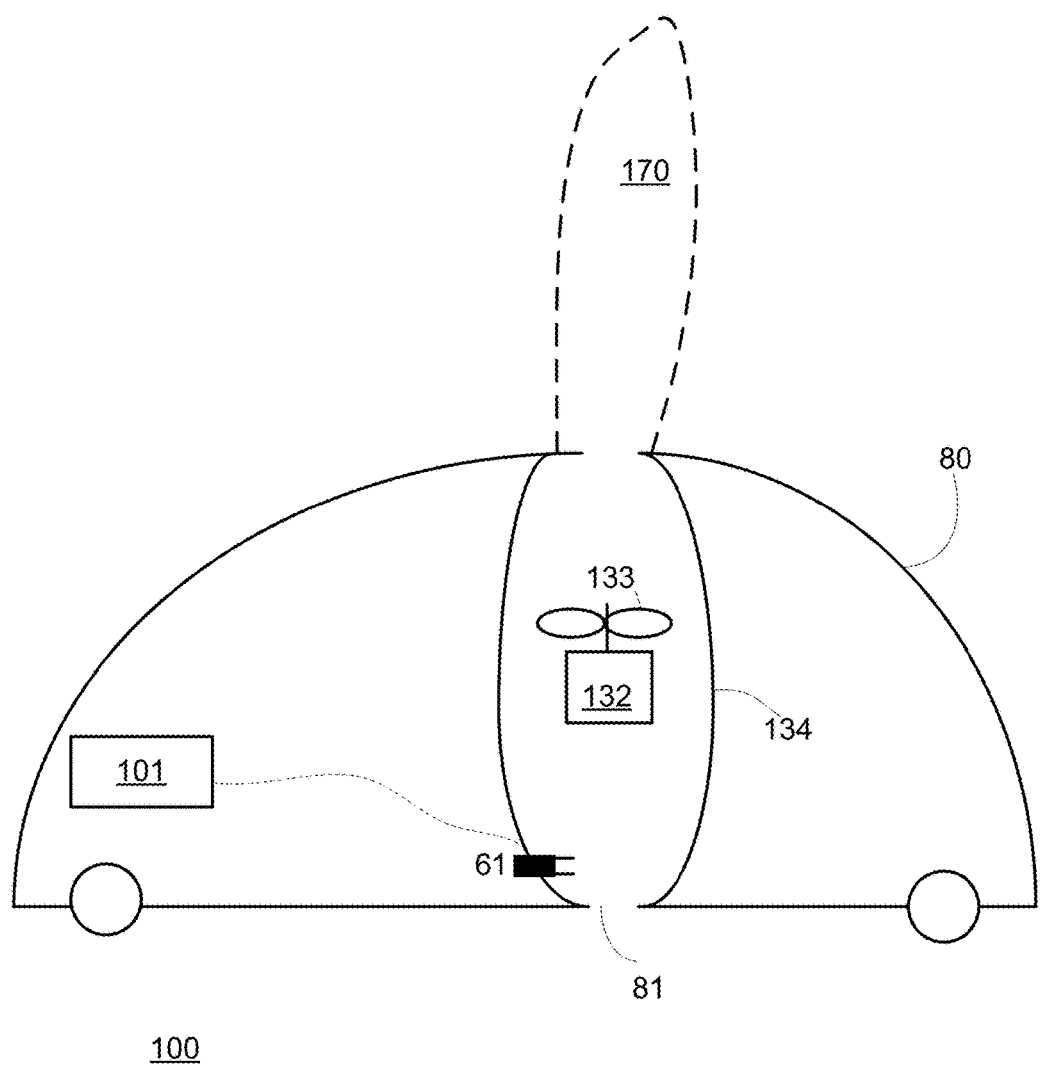

FIG. 2B is a cross sectional view of an example of of a pool cleaning robot 100. The pool cleaning robot of FIG. 2B differs from the pool cleaning robot of FIG. 2A by not including other calorimetric sensor 62.

Figure 2C:
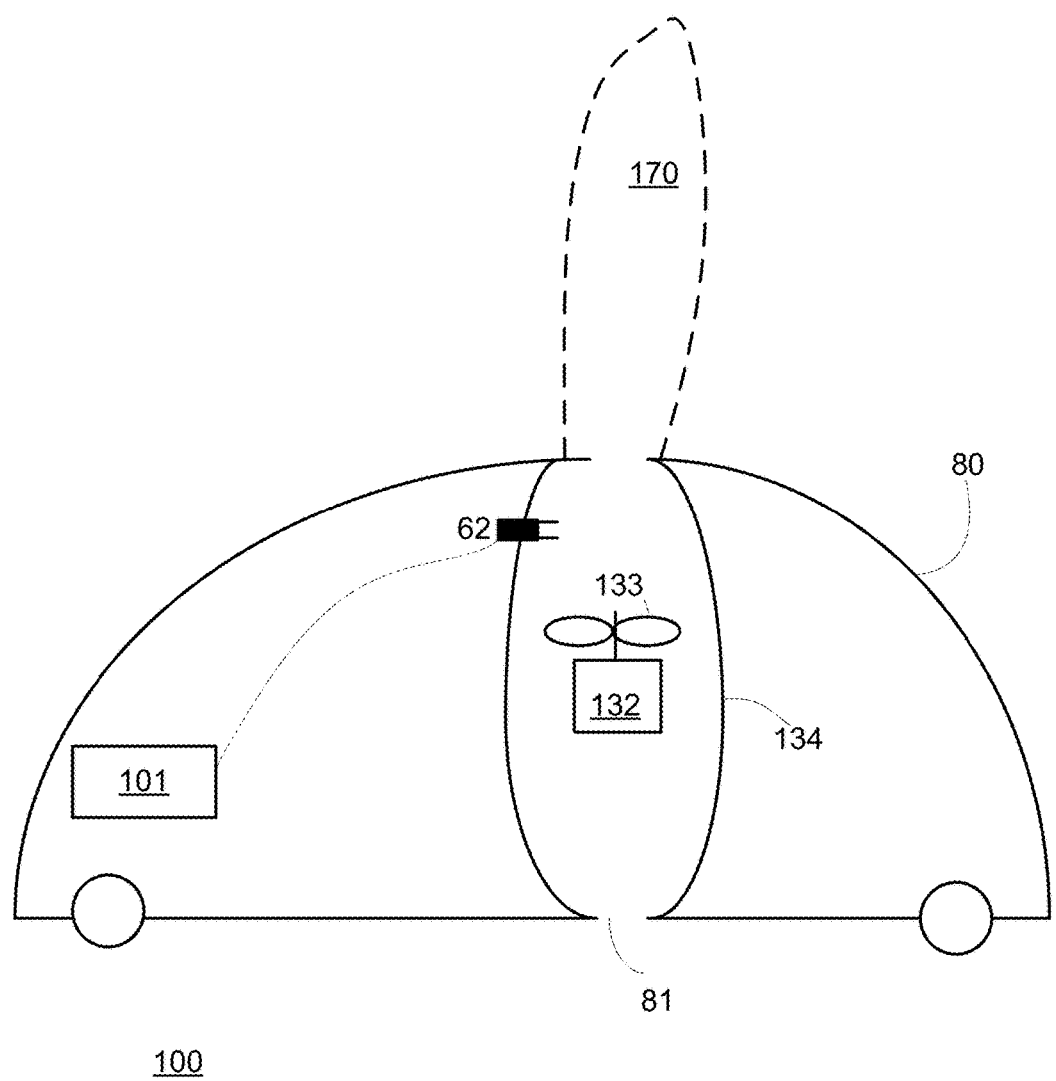

FIG. 2C is a cross sectional view of an example of of a pool cleaning robot 100. The pool cleaning robot of FIG. 2C differs from the pool cleaning robot of FIG. 2A by not including calorimetric sensor 61.

Figure 3A:
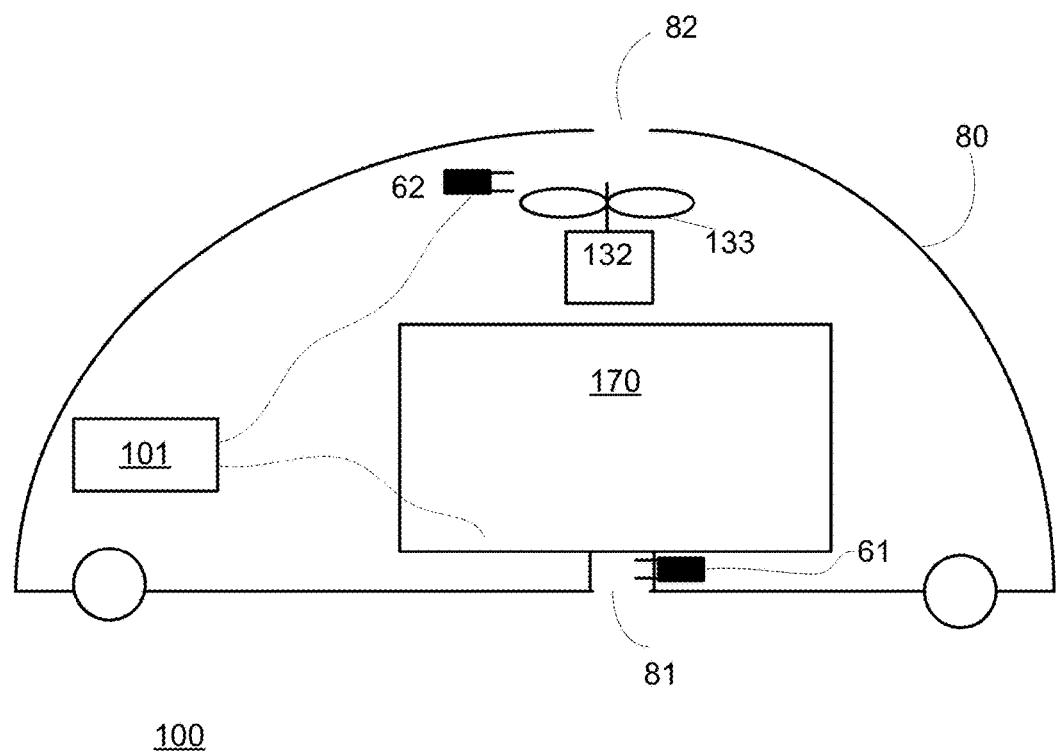
FIGS. 3A and 3B are examples of pool cleaning robots.

FIG. 3A is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, calorimetric sensor 61 that is positioned near the opening 81, another calorimetric sensor 62 that is positioned near opening 82—for example between filtering unit 170 and opening 82.

Controller 101 may control the pool cleaning robot and may receive detection signals from calorimetric sensors 61 and 62. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 3B:
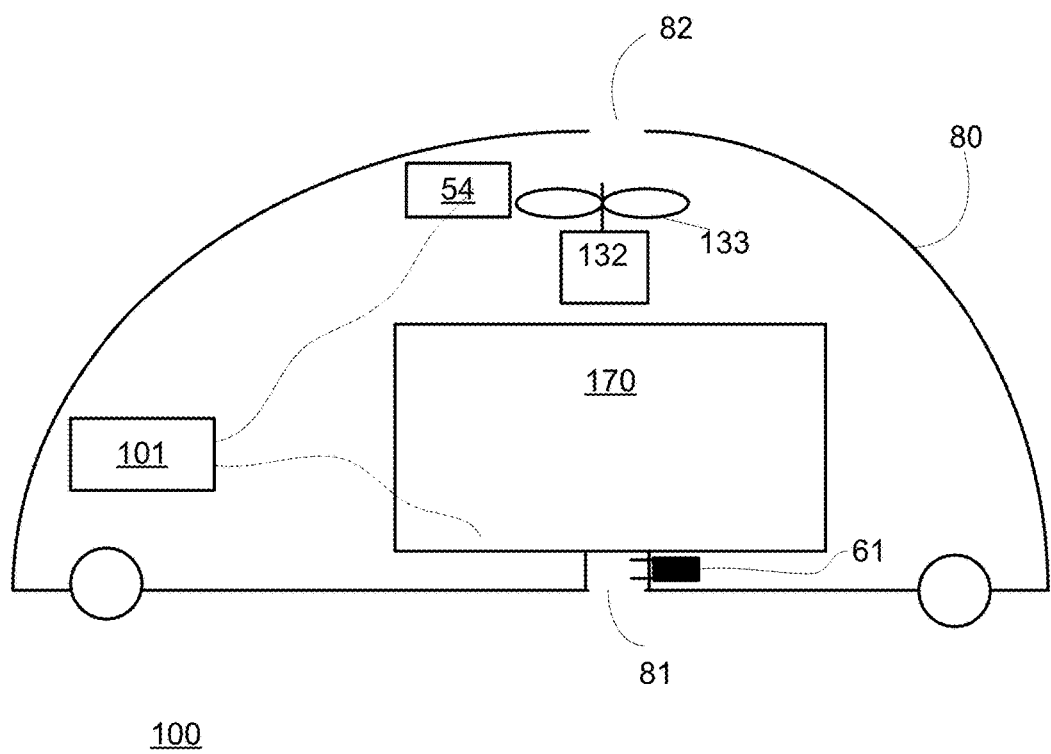

FIG. 3B is a cross sectional view of an example of of a pool cleaning robot 100. The pool cleaning robot of FIG. 3B differs from the pool cleaning robot of FIG. 3A by having accelerometer 54 instead of other calorimetric sensor 62.

It should be noted that the accelerometer 54 may be provided instead of calorimetric sensor 61 or in addition to any number of calorimetric sensors.

Figure 4A:
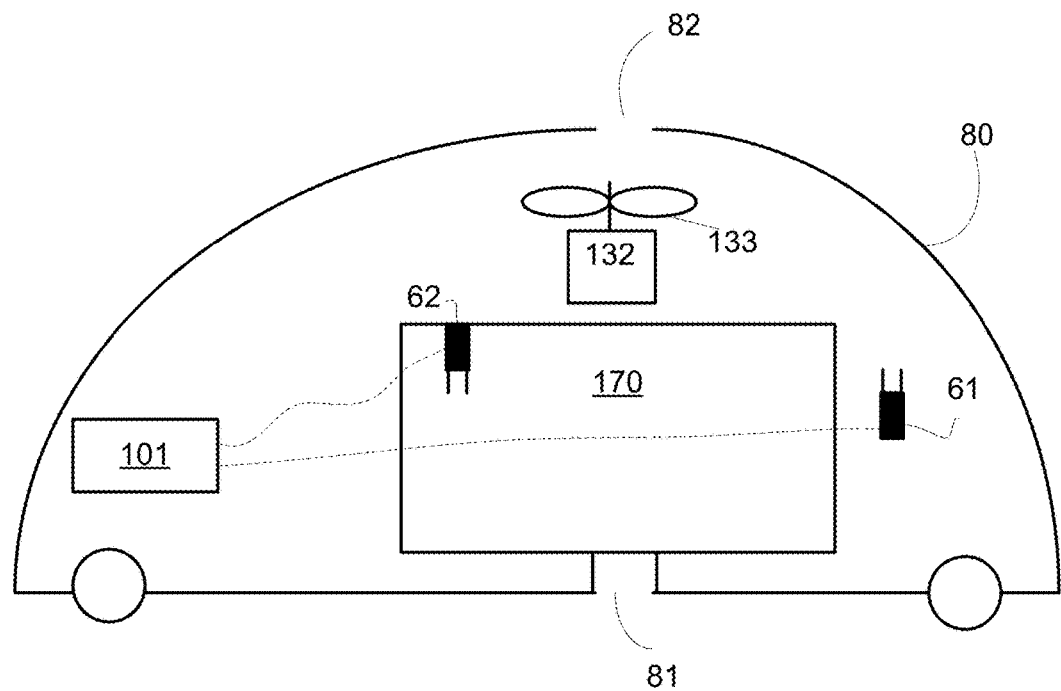
FIGS. 4A, 4B and 4C are examples of pool cleaning robots.

FIG. 4A is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, calorimetric sensor 61 that is positioned outside the filtering unit 170 (but within the fluid path), and another calorimetric sensor 62 that is positioned inside the filtering unit 170.

Controller 101 may control the pool cleaning robot and may receive detection signals from calorimetric sensors 61 and 62. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 4B:
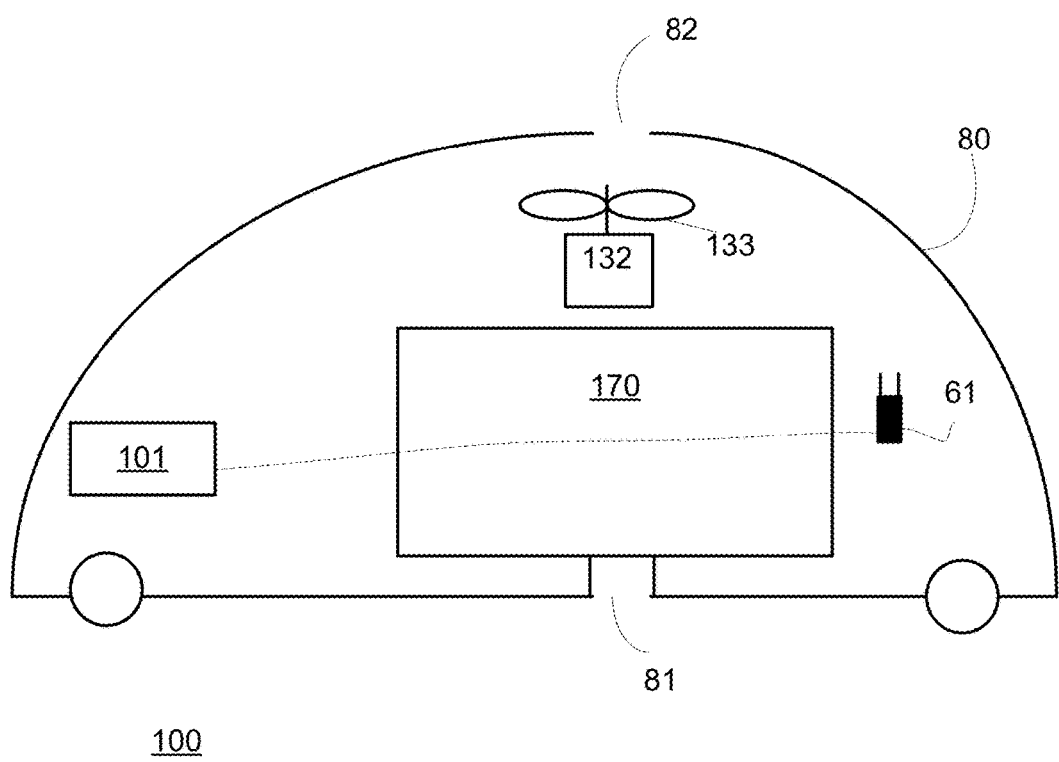

FIG. 4B is a cross sectional view of an example of of a pool cleaning robot 100. The pool cleaning robot of FIG. 4B differs from the pool cleaning robot of FIG. 4A by not including other calorimetric sensor 62.

Figure 4C:
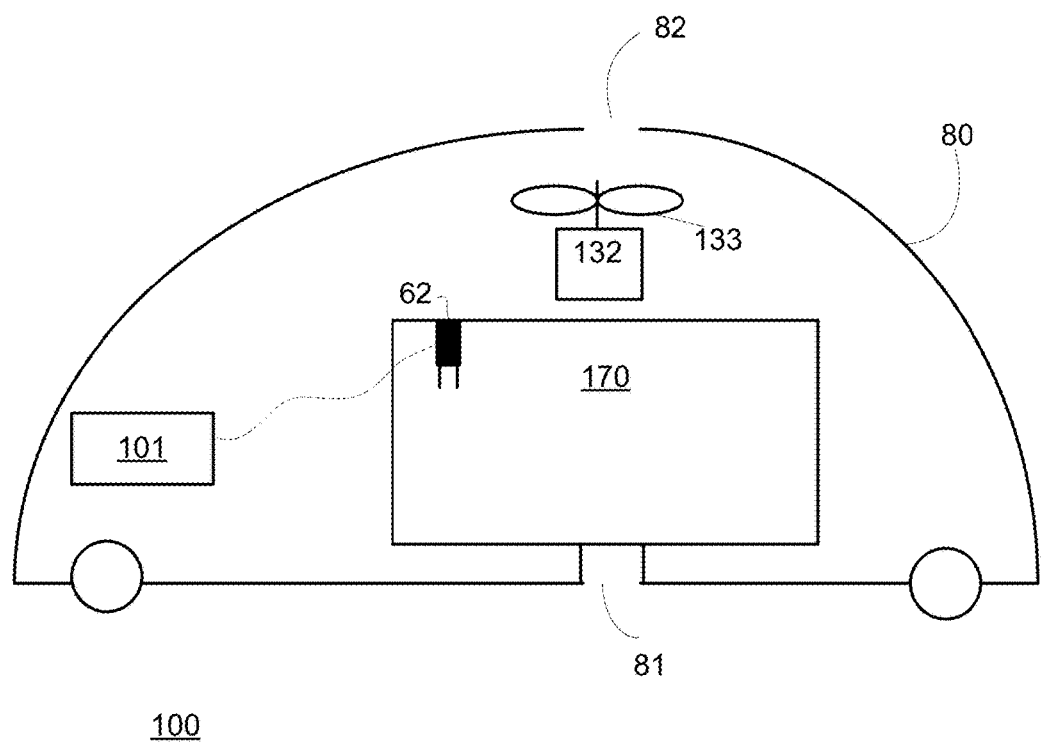

FIG. 4C is a cross sectional view of an example of of a pool cleaning robot 100. The pool cleaning robot of FIG. 4C differs from the pool cleaning robot of FIG. 4A by not including calorimetric sensor 61.

Figure 5:
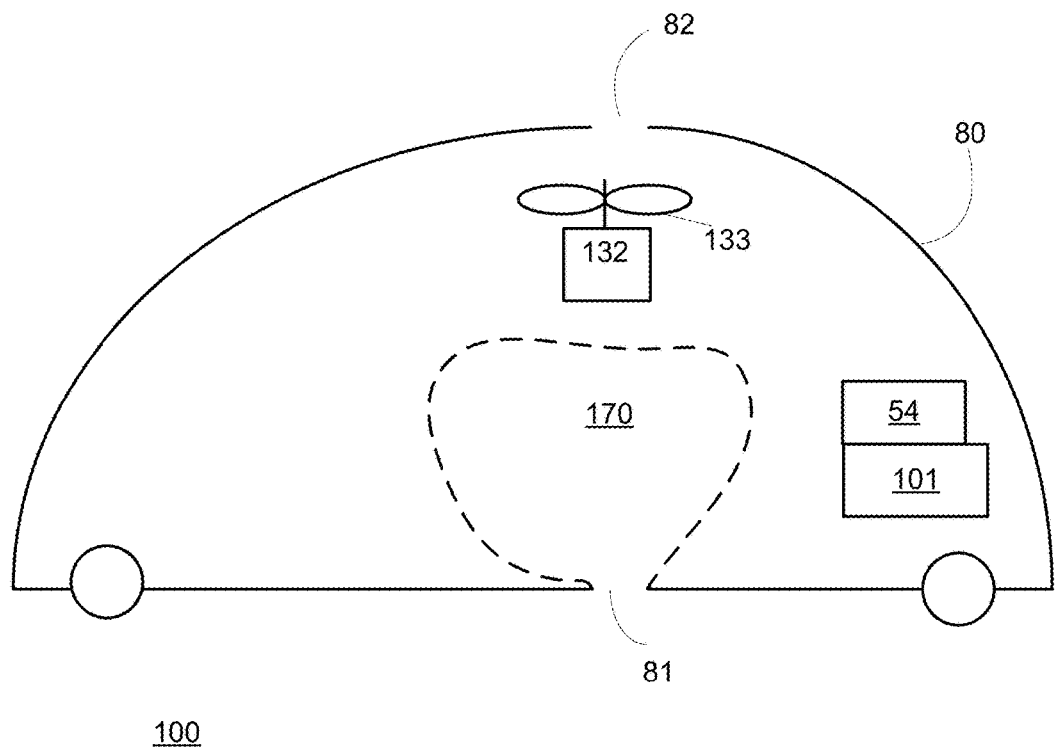
FIG. 5 is an example of a pool cleaning robot.

FIG. 5 is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, and accelerometer 54 for sensing the accelerations of the pool controller.

Controller 101 may control the pool cleaning robot and may receive detection signals from accelerometer 54. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 6A:
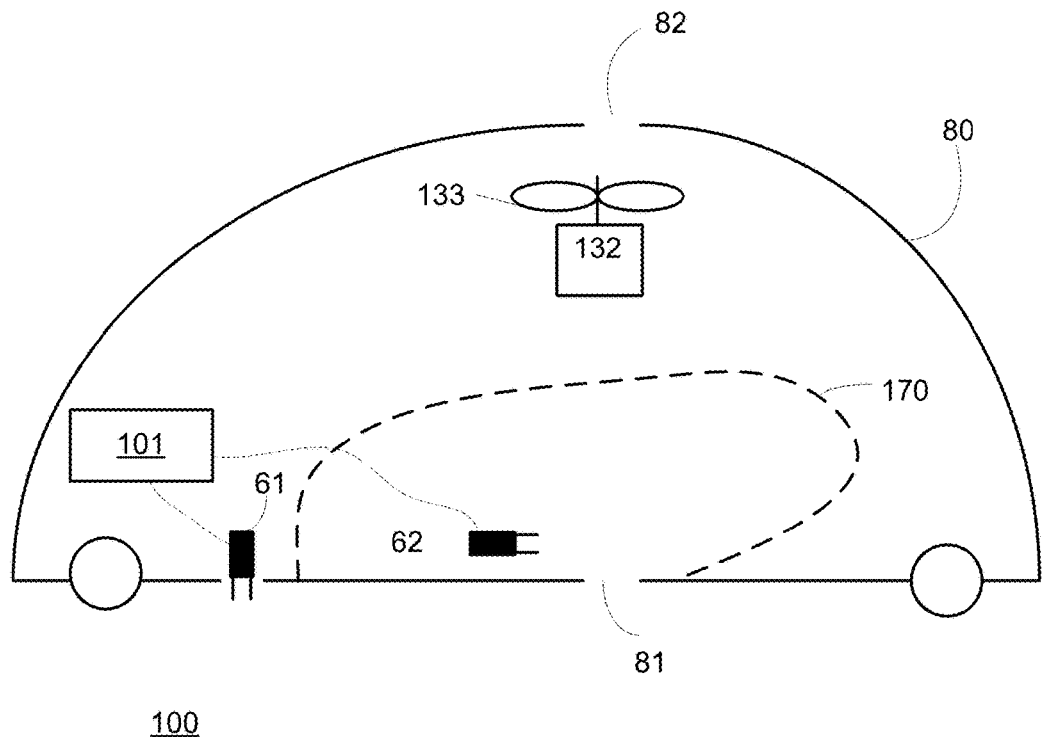
FIG. 6A is an example of a pool cleaning robot.

FIG. 6A is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, other calorimetric sensor 62 that is positioned inside the filtering unit 170 (but within the fluid path), and calorimetric sensor 61 that is positioned at least partially outside housing 80. Calorimetric sensor 61 may sense the flow of fluid that flows outside the pool cleaning robot and towards the water ingress sport 81.

Controller 101 may control the pool cleaning robot and may receive detection signals from calorimetric sensors 61 and 62. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 6B:
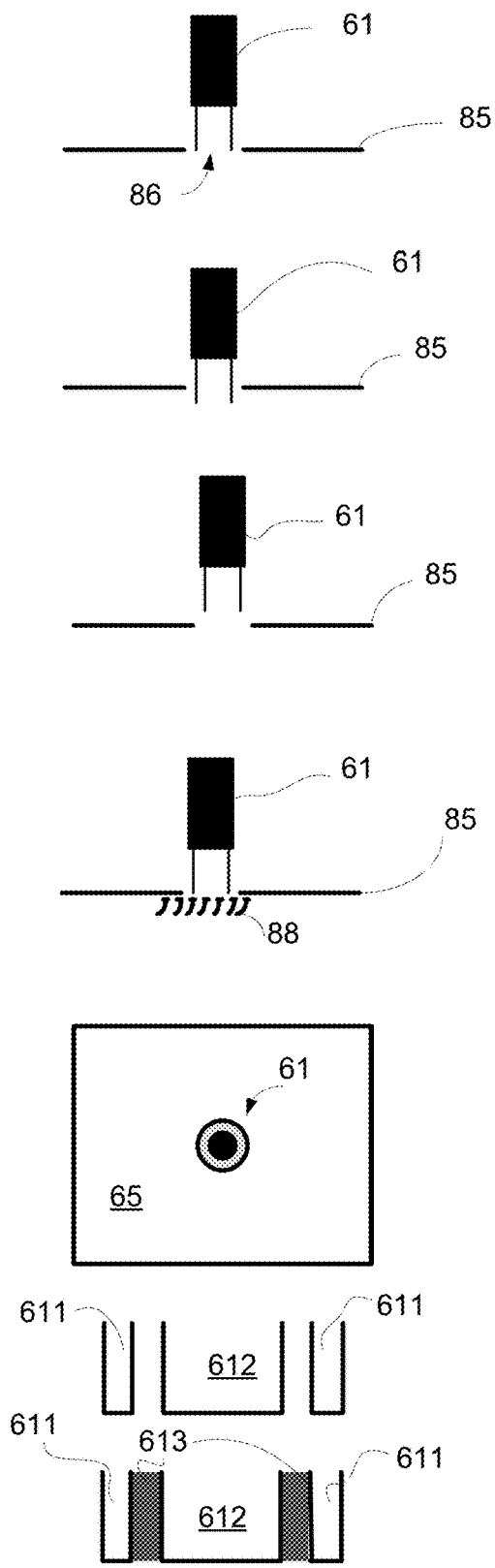
FIG. 6B is an example of various components of a pool cleaning robot.

FIG. 6B illustrates various positioned and types of colorimetric sensors. The calorimetric sensor 61 has a sensing edge—where the thermal resistors contact the fluid. The sensing edge may pass through (or be proximate to) an opening 86 at the bottom of the housing 85. The sensing edge may be at the substantially the same level as the bottom of the housing, at the exact level of the bottom of the housing, may extend outside the bottom of the housing or may be slightly above the bottom of the housing. Substantially may mean within few centimeters or few millimeters from the bottom of the housing. Few may mean, for example, between 1 and 10. Any spatial relationship between the calorimetric sensor 61 and any part of the housing may be provided. Although FIG. 6A illustrates the bottom of the housing—the calorimetric sensor 61 may be positioned elsewhere—in relation to another opening of the housing.

FIG. 6B also shows that a cleaning element such as bristles 88 may precede the sensing edge of the calorimetric sensor 61. This may prevent the calorimetric sensor 61 from being clogged.

FIG. 6B also shows a bottom view of a part of the bottom 85 and a calorimetric sensor 61 that has a cylindrical shape with a central circular thermal resistor 612 that is surrounded by a cylindrical external thermal resistor 611. The calorimetric sensor 61 may have any shape and/or size.

FIG. 6B also illustrates a cross section of the calorimetric sensor 61 that has a cylindrical shape in which there is a gap between the lower parts of the central circular thermal resistor 612 and the cylindrical external thermal resistor 611.

FIG. 6B also illustrates a cross section of the calorimetric sensor 61 that has a cylindrical shape in which there is filling element 613 that is positioned in a gap between the lower parts of the central circular thermal resistor 612 and the cylindrical external thermal resistor 611.

Figure 7:
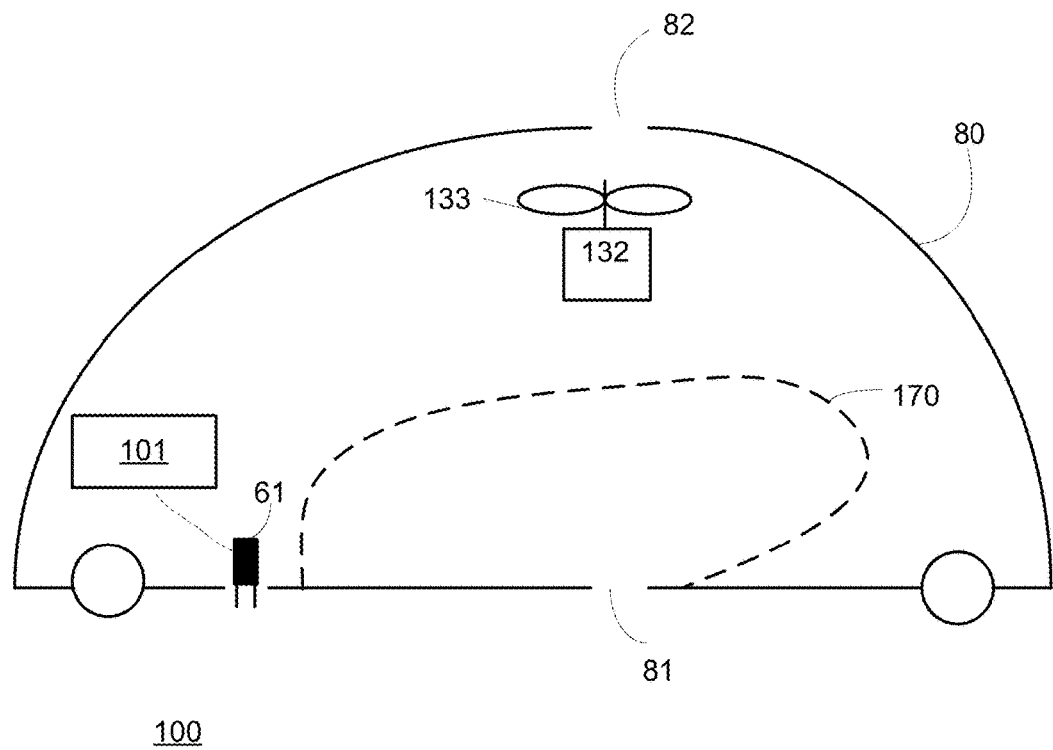
FIGS. 7-10 are examples of pool cleaning robot.

FIG. 7 is a cross sectional view of an example of of a pool cleaning robot 100. The pool cleaning robot of FIG. 7 differs from the pool cleaning robot of FIG. 6 by not including other calorimetric sensor 62.

Figure 8:
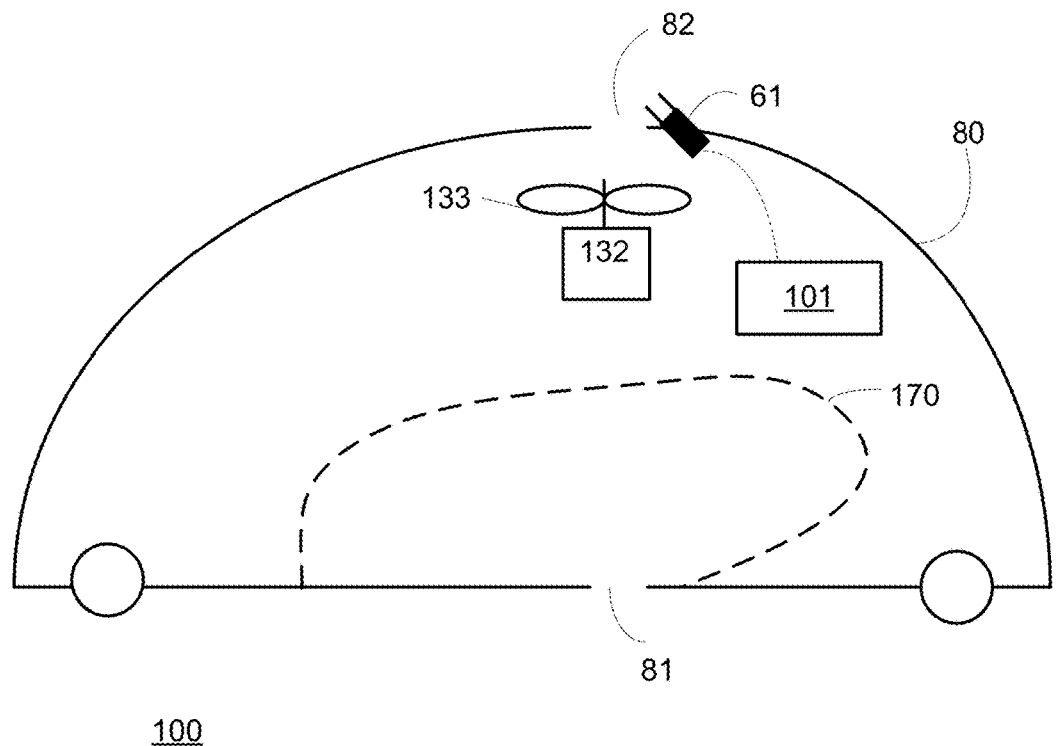

FIG. 8 is a cross sectional view of an example of of a pool cleaning robot 100. The pool cleaning robot of FIG. 8 differs from the pool cleaning robot of FIG. 7 by having the calorimetric sensor 61 extending (at least partially) outside the housing 80—near upper outlet 82. Calorimetric sensor 61 may sense the flow of fluid that is ejected through opening 82.

Figure 9:
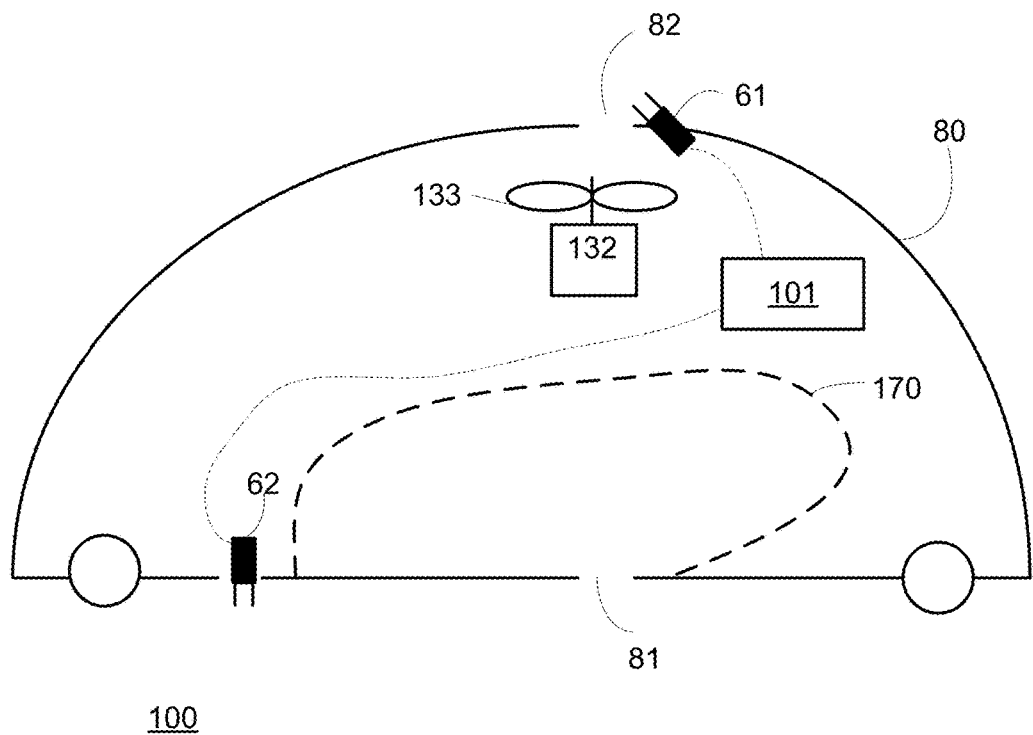

FIG. 9 is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, calorimetric sensor 61 that is positioned at least partially outside housing 80—near opening 81, and other calorimetric sensor 62 that is positioned at least partially outside housing 80—and extends through the bottom of the housing.

Calorimetric sensor 62 may be located flush in the bottom of the housing that incorporates opening 81 or may form part of the abovementioned motor unit (not shown). Whereby, the sensor incorporated in the said motor unit, is inserted and located in a customized opening at the said bottom plate in proximity and facing the floor or wall swimming pool surfaces so that it may sense and measure the flow of water while in movement towards inlet 81.

Controller 101 may control the pool cleaning robot and may receive detection signals from calorimetric sensors 61 and 62. Controller 101 may determine the cleanliness of the filtering unit based on detection signals. Alternatively, the controller 101 may send the detection signals (either processed or "as is") to another entity that may determine the cleanliness of the filtering unit based on the detection signals.

Figure 10:
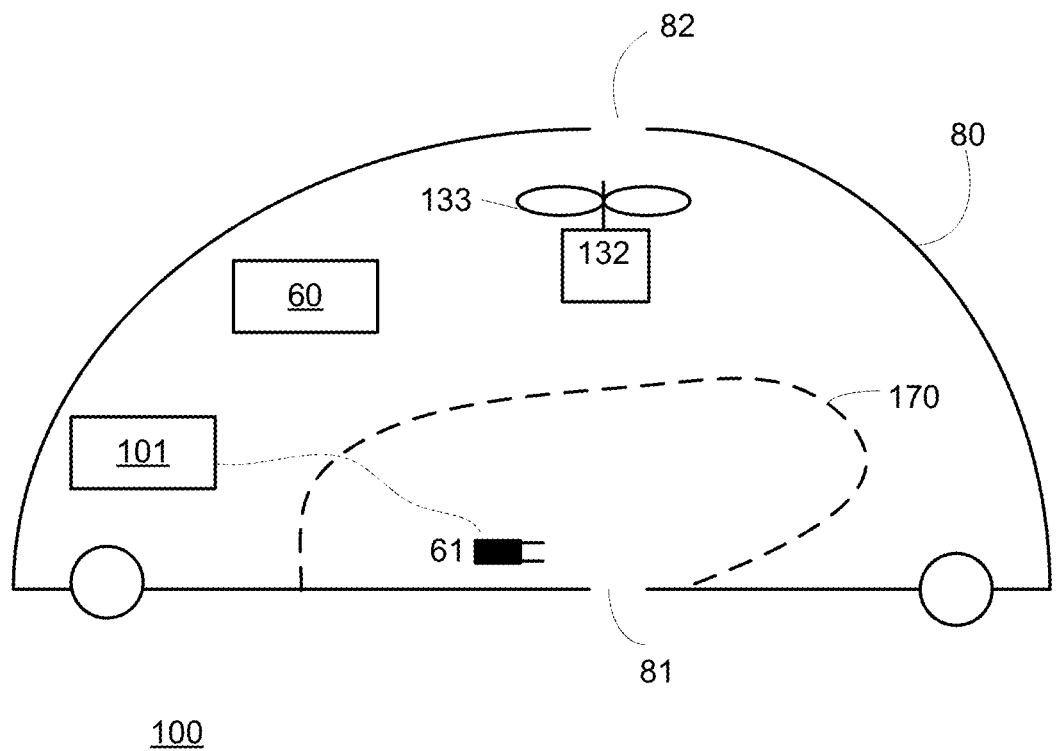

FIG. 10 is a cross sectional view of an example of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, calorimetric sensor 61 that is positioned inside the filtering unit 170, a communication module 60.

Controller 101 may control the pool cleaning robot and may receive detection signals from calorimetric sensor 61. Controller 101 may determine the cleanliness of the filtering unit based on detection signals. Alternatively, the controller 101 may send the detection signals (either processed or "as is") via communications module 60 to another entity that may determine the cleanliness of the filtering unit based on the detection signals.

Figure 11A:
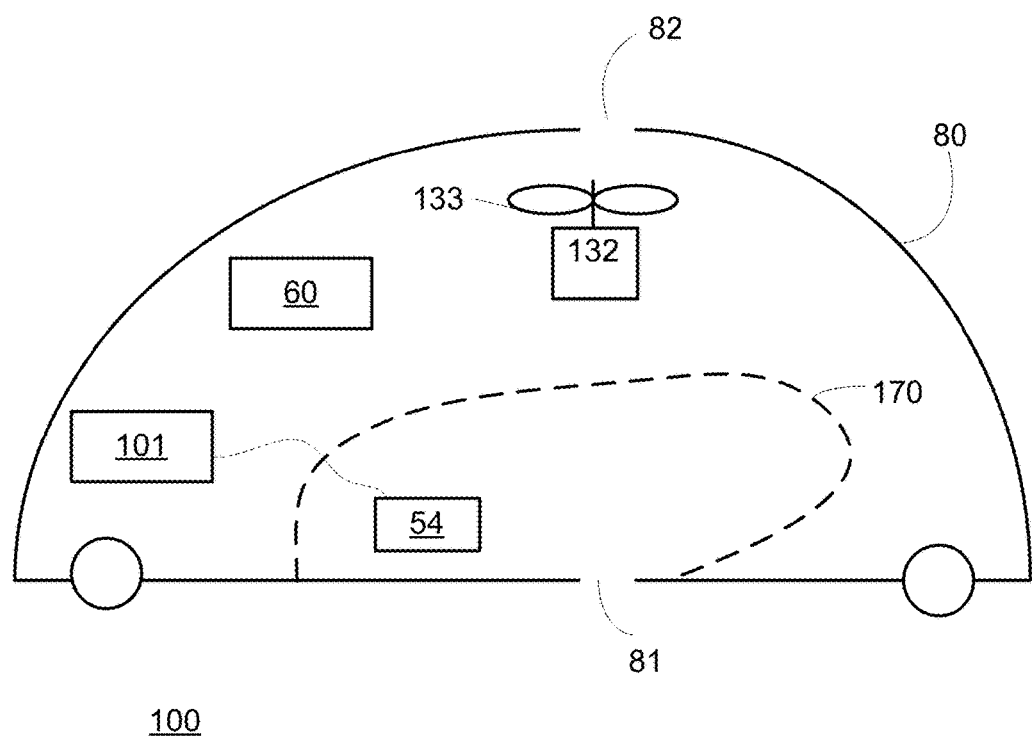
FIG. 11A is an example of a pool cleaning robot.

FIG. 11A is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, accelerometer 54 that is positioned inside the filtering unit 170, a communication module 60.

Controller 101 may control the pool cleaning robot and may receive detection signals from accelerometer 54. Controller 101 may determine the cleanliness of the filtering unit based on detection signals. Alternatively, the controller 101 may send the detection signals (either processed or "as is") via communications module 60 to another entity that may determine the cleanliness of the filtering unit based on the detection signals.

Figure 11B:
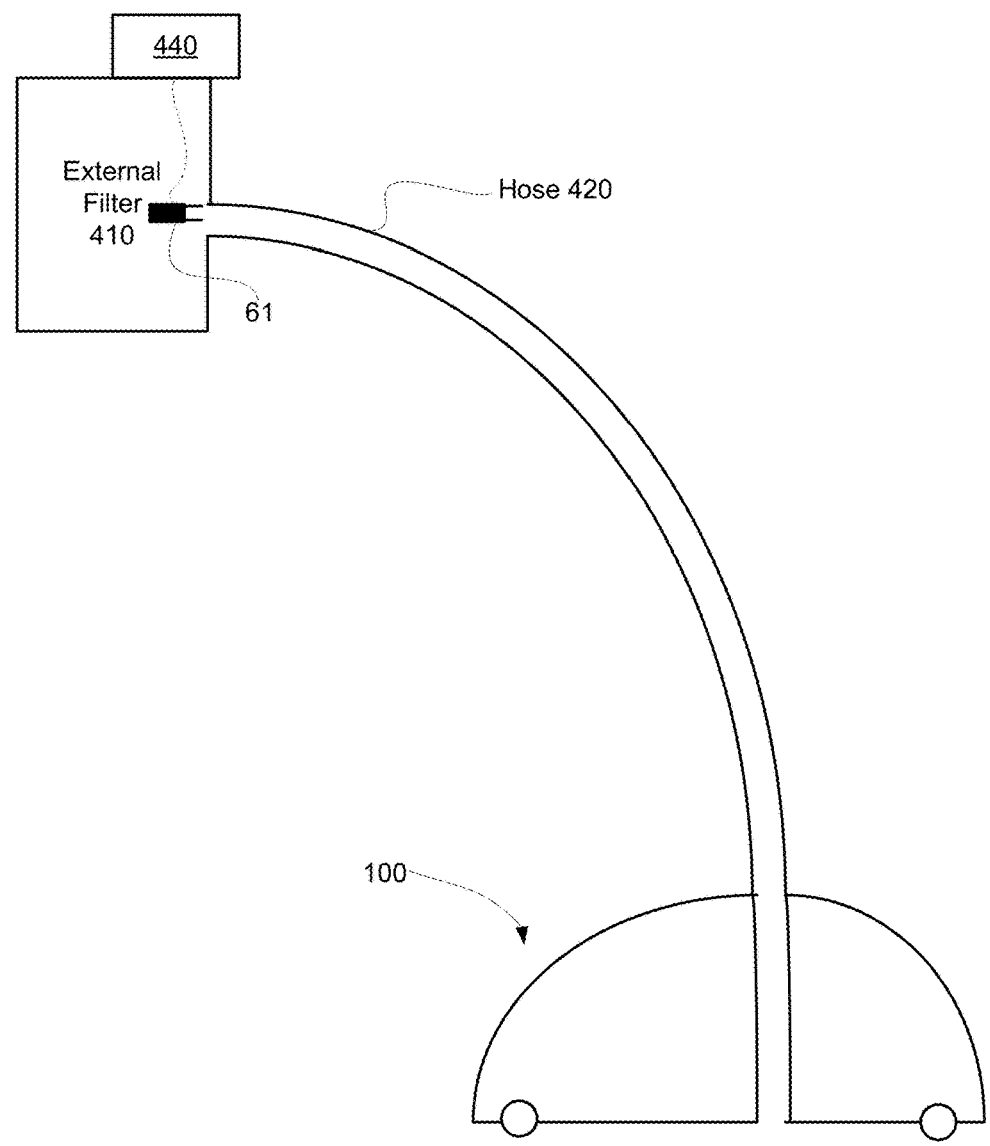
FIGS. 11B and 11C are examples of pool cleaning robots that are fluidly coupled to an external filter.
Figure 11C:
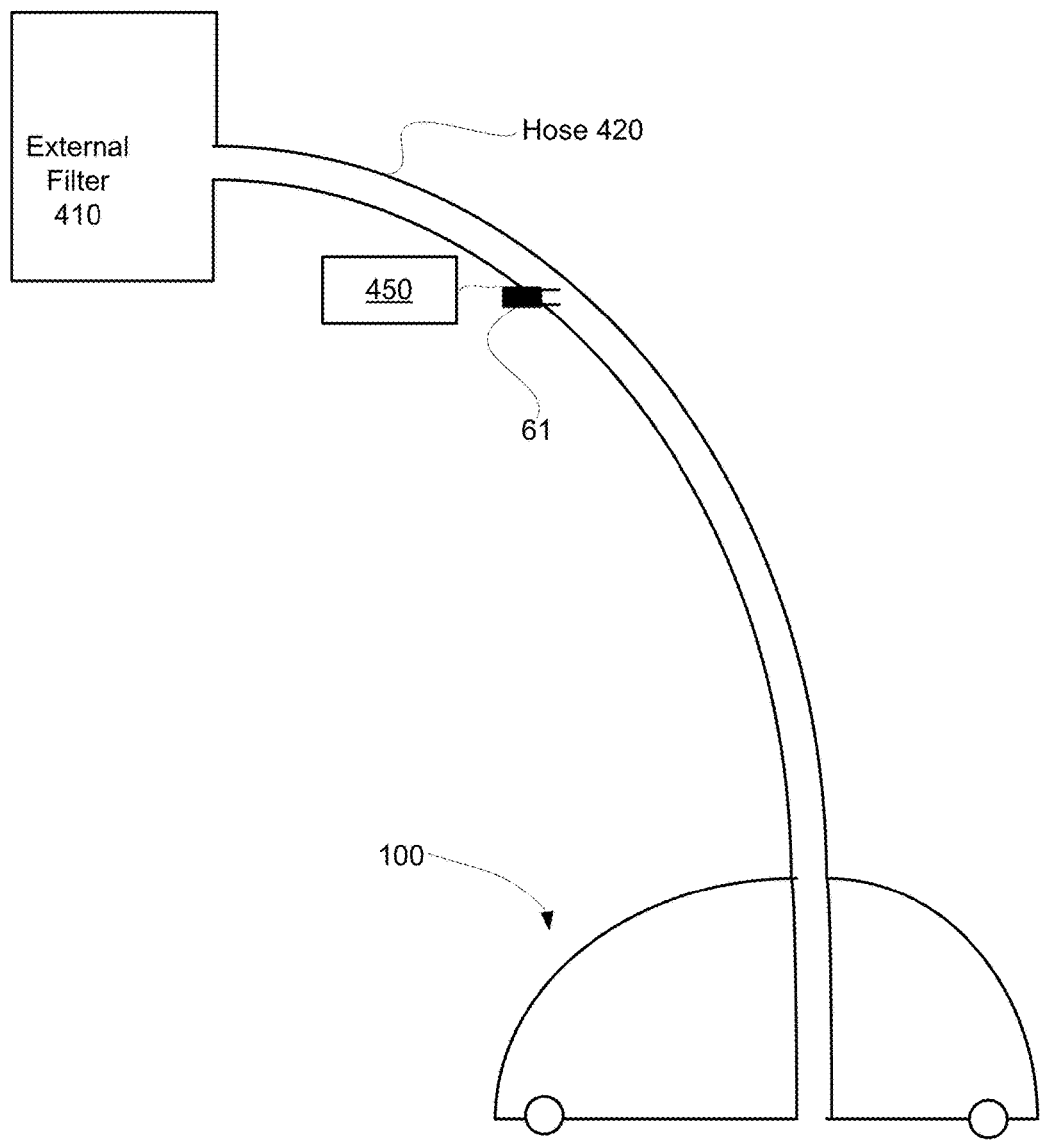

FIGS. 11B and 11C illustrates a pool cleaning robot 100 that is fluidly coupled via hose 420 to an external filter 410. One or more calorimetric sensors (such as calorimetric sensor 61) may be positioned within hose 420 and/or the external filter 410—or anywhere within the hydraulic path that starts within the pool cleaning robot 100 and ends at the external filter. Thus—zero or more calorimetric sensors may be positioned within the pool cleaning robot and zero or more calorimetric sensors may be positioned outside the pool cleaning robot.

An example of a pool cleaning robot that is fluidly coupled to an external filtering unit is illustrated in U.S. Pat. No. 9,133,639 that is incorporated herein. A calorimetric sensor may be located anywhere inside the said hose, at the entrance or exit of the said external hose, while being wired and connected to a control PCB and being powered by low voltage hydraulically produced on-board electrical power device such as a turbine/generator when such a pool cleaner is hydraulically powered and does not have its own electrical power supply inputs (a power supply or batteries).

In this configuration—the signals of the calorimetric sensor 61 may be send and/or processed to the pool cleaning robot and/or to an external unit located outside the pool cleaning robot. The external unit may be a processor, a communication unit or both. The processing—especially determining the cleanliness of the filter—may be done by the external unit or by yet another processor—in the pool cleaning robot or outside the pool cleaning robot. FIG. 11B illustrates an external unit 440 that receives the signals from calorimetric sensor 61. FIG. 11C illustrates an external unit 450 that receives the signals from calorimetric sensor 61.

Figure 12:
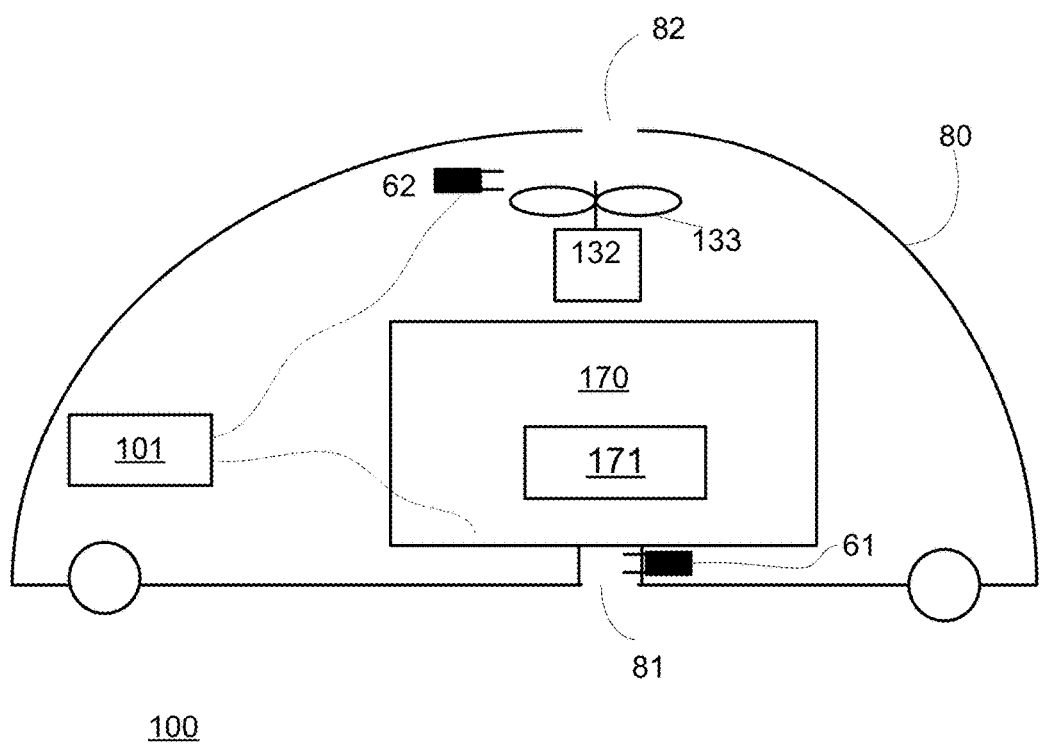
FIG. 12 is an example of a pool cleaning robot.

FIG. 12 is a cross sectional view of an example of of a pool cleaning robot 100 that has housing 80, opening 81, pump motor 132, impeller 133 that is rotated by pump motor 132 and causes a suction of the fluid and jet of fluid to be ejected from an opening 82, filtering unit 170 such as an internal filter element (bag or cartridge) that is positioned inside housing 80, calorimetric sensor 61 that is positioned near the opening 81 (near the bottom of the housing), another calorimetric sensor 62 that is positioned near opening 82 (near the top of the housing)—for example between filtering unit 170 and opening 82. FIG. 12 also illustrates a cleaning unit 171 for cleaning the filtering unit 170.

Controller 101 may control the pool cleaning robot and may receive detection signals from calorimetric sensors 61 and 62. Controller 101 may determine the cleanliness of the filtering unit based on detection signals. Alternatively, the controller 101 may send the detection signals (either processed or "as is") to another entity that may determine the cleanliness of the filtering unit based on the detection signals.

Once the cleanliness of the filter is determined (or for any other reason—for example when implementing a periodic cleaning process)—controller 101 may instruct cleaning unit 171 to clean the filtering unit 170.

A cleaning unit may be internal to the filtering unit, external to the pool cleaning robot, or internal to the pool cleaning robot but external to the filtering unit.

Figure 13:
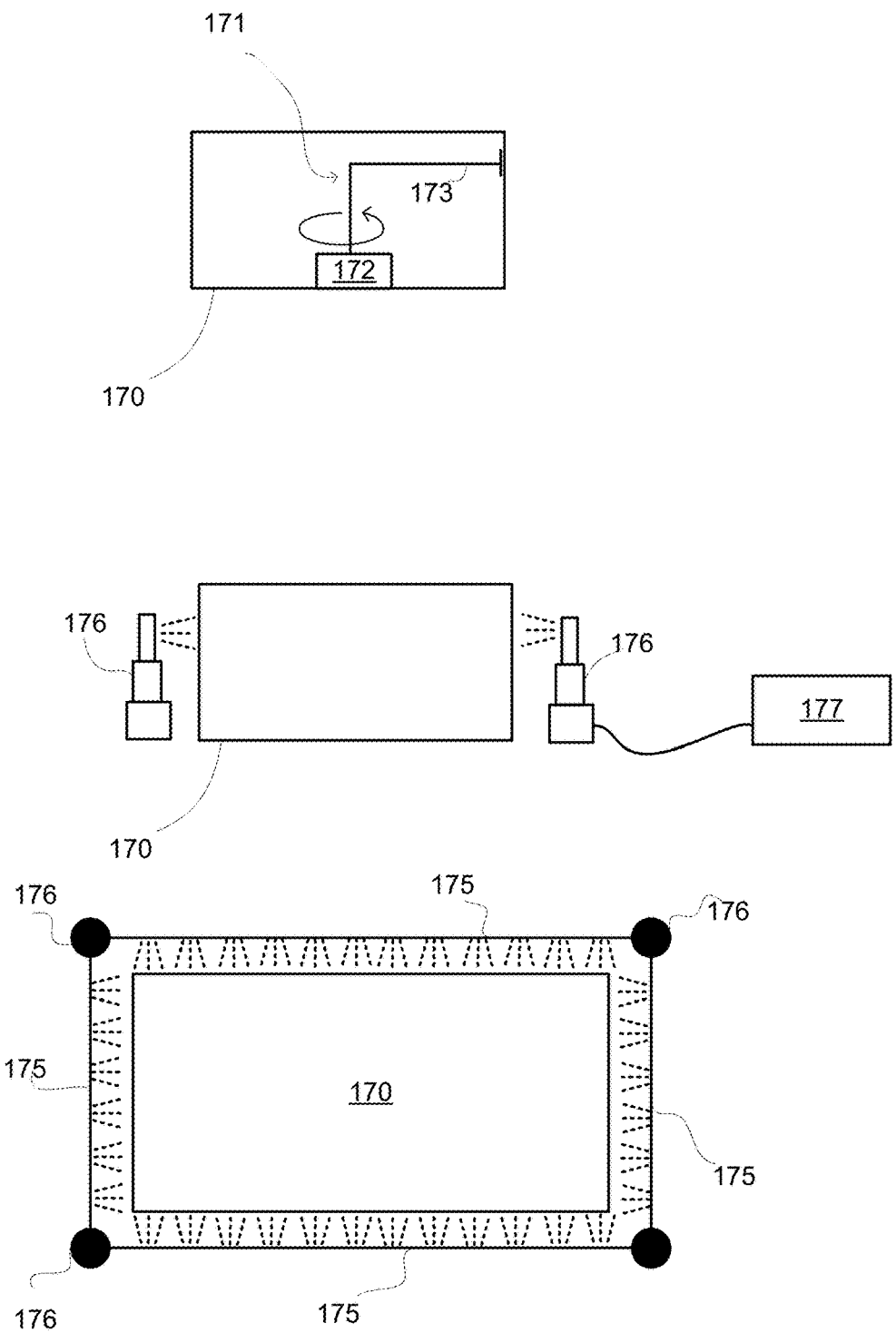
FIG. 13 is an example of cleaning units of pool cleaning robots.

FIG. 13 illustrates examples of cleaning units that are internal to the housing 80.

The upper part of FIG. 13 illustrates a brushing element 173 that has an arm and an axle—and is rotated about the axle by rotator 172. The brushing element may contact an inner wall of a cylindrical filter of the filter unit and scrub the inner wall, may perform contactless cleaning by directing jets of fluid to the inner wall—and the like.

The lower part of FIG. 13 includes a side view and a top view of a cleaning unit that is external to the filtering unit 170 and may scan (for example—using telescopic support elements that may move upwards and downwards—under the control of a fluid motor) multiple perforated rods 175 (or other fluid conduits with openings or nozzles that face the filtering unit) so that fluid jets may scan the exterior walls of the filtering unit 170.

Figure 14:
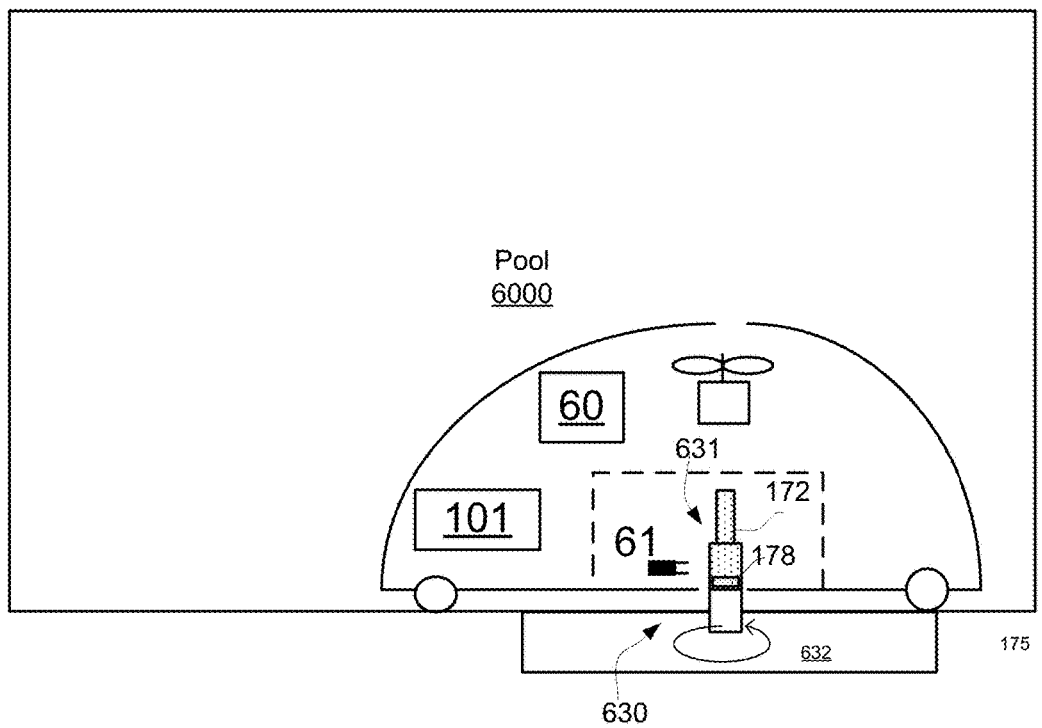
FIG. 14 is an example of a pool cleaning robot and an external cleaning unit.

FIG. 14 illustrates an example of a cleaning unit that is external to the housing 80.

During a filter cleaning process, a part of a cleaning unit 630 (such as a pop-up sprinkler 631) may enter through 81 into filtering unit 170.

The pop-up sprinkler 631 may have a cross section that is smaller than the opening 81 thereby the pop-up sprinkler may, even when passing through the opening 81, may not seal the opening 81 and may leave a space for fluid and/or debris to exit the pool cleaning robot through the opening 81 during the cleaning process. The cross section of the pop-up sprinkler and/or the opening may have any shape and/or size. The cross section of the pop-up sprinkler may have the same shape or may differ from each other by shape.

The pop-up sprinkler 631 may include a valve 178. The valve 178 may be a ball valve that creates intermittent water jet spray thrusts to improve and create powerful streams of internal nozzle spraying to remove stubborn dirt or debris attached. Multiple nozzles or openings may be employed with varying nozzle diameter apertures along the pop up sprinkler rod. This is especially important in initial cleaning cycles when season starts and the dirt from the previous bathing season clings hard onto the filter surfaces.

The additional liquid container 632 containing cleaning fluid such as, for example an anti-calc substance may be used to mix this said liquid with the spraying water.

The pop-up sprinkler 631 may be rotated about an axis or not. In FIG. 14 base 631 of cleaning unit 630 may rotate the pop-up sprinkler 631.

The pop-up sprinkler may be made of a rigid material or of a softer material such as soft rubber that will inflate into the interior space of the filter or as stated above, expand/contract telescopically. The process will be preferably mechanical but may be subject to an electrical/electronic control.

It is noted that the pop-up sprinkler is merely a non-limiting example of a cleaning element. Other cleaning elements may include, for example, elastic and/or non-elastic cleaning elements, cleaning elements that include a hollow tube or a hollow bag with a fluid inlet and a fluid outlet, pop-up cleaning elements that are not rods, telescopic cleaning elements, cleaning elements that do not pop-up, and the like.

The operation of the pop-up sprinkler is as follows: as the filter becomes clogged during normal cycle time in-pool operation while the pool cleaning robot is submerged, the pool cleaner records the level of clogging and will classify it to anything between severely clogged to containing some minor dirt. This will be communicated to the controller of the docking station to determine a cleaning process that may fit the state of the filtering unit. The sensing of the state of the filtering unit may be sensed by using one or more calorimetric sensor (such as 61 and 62) and/or by using an accelerometer.

Figure 15:
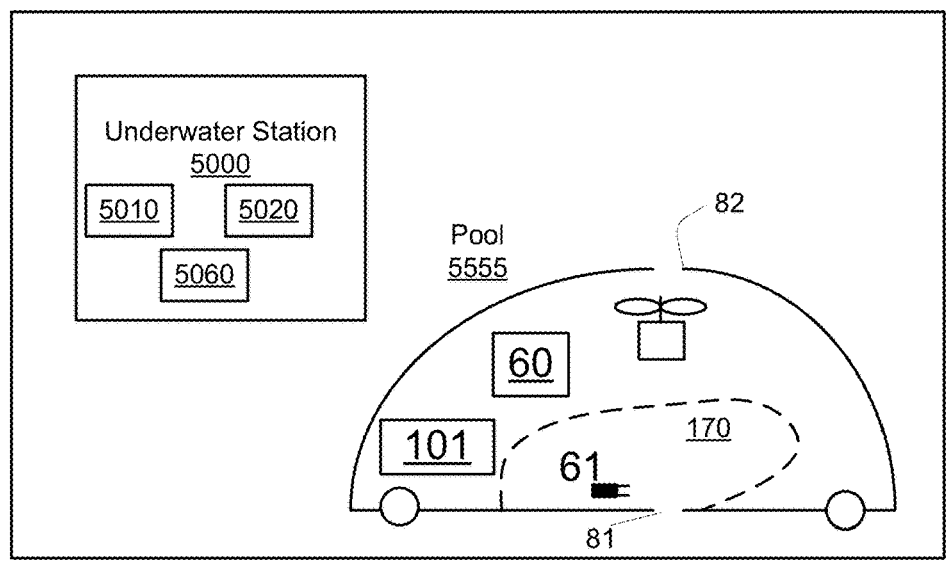
FIG. 15 is an example of a pool cleaning robot and an underwater station.

FIG. 15 is an example of a pool cleaning robot 100 and of an underwater station 5000 that is positioned within the pool 5555 cleaned by the pool cleaning robot 100.

Pool cleaning robot 100 that has housing 80, opening 81, pump motor, impeller that is rotated by pump motor and causes a suction of the fluid and jet of fluid to be ejected from an opening 82, filtering unit 170 such as an internal filter element (bag or cartridge) that is positioned inside housing 80, calorimetric sensor 61 that is positioned inside the filtering unit 170 and communication module 60.

Controller 101 may control the pool cleaning robot and may receive detection signals from calorimetric sensor 61. Controller 101 may determine the cleanliness of the filtering unit based on detection signals. Alternatively, the controller 101 may send the detection signals (either processed or "as is") to underwater station 5000 that may determine the cleanliness of the filtering unit based on the detection signals. The controller 101 may determine the cleanliness of the filter and instruct (or request) the underwater station 5000 to clean the filtering unit, to replace the filtering unit, and even may send the parameters of the cleaning process to the underwater station 5000.

The underwater station 5000 may include a processor 5010 for calculating the cleanliness of the filtering unit, a filter cleaning unit and/or a filter replacement unit 5020, and a communication module 5060 capable of communicating with the communication module 60 of the pool cleaning robot 100.

Figure 16:
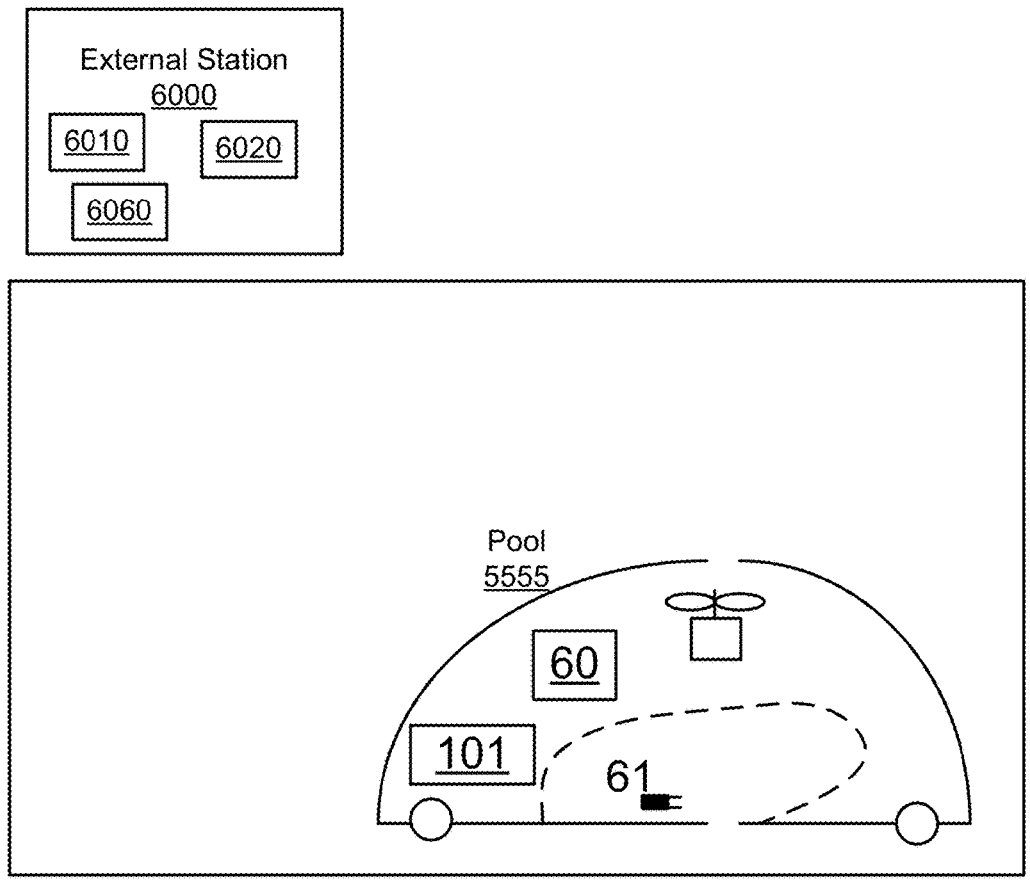
FIG. 16 is an example of a pool cleaning robot and an external station.

FIG. 16 is an example of a pool cleaning robot 100 and of an external station 6000 that is positioned outside the pool 5555 cleaned by the pool cleaning robot 100.

Pool cleaning robot 100 that has housing 80, opening 81, pump motor, impeller that is rotated by pump motor and causes a suction of the fluid and jet of fluid to be ejected from an opening 82, filtering unit 170 such as an internal filter element (bag or cartridge) that is positioned inside housing 80, calorimetric sensor 61 that is positioned inside the filtering unit 170 and communication module 60.

Controller 101 may control the pool cleaning robot and may receive detection signals from calorimetric sensor 61. Controller 101 may determine the cleanliness of the filtering unit based on detection signals. Alternatively, the controller 101 may send the detection signals (either processed or "as is") to external station 6000 that may determine the cleanliness of the filtering unit based on the detection signals. The controller 101 may determine the cleanliness of the filter and instruct (or request) the external station 6000 to clean the filtering unit, to replace the filtering unit, and even may send the parameters of the cleaning process to the external station 6000.

The external station 6000 may include a processor 6010 for calculating the cleanliness of the filtering unit, a filter cleaning unit and/or a filter replacement unit 6020, and a communication module 6060 capable of communicating with the communication module 60 of the pool cleaning robot 100.

Figure 17A:
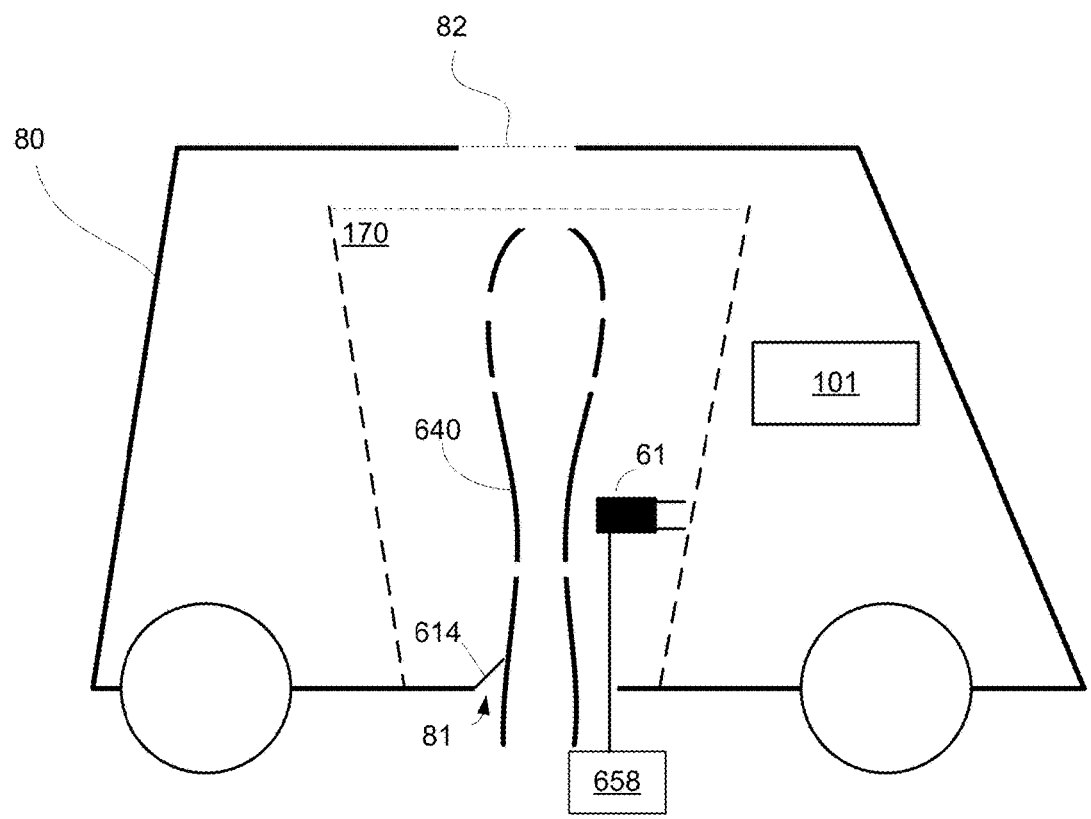
FIGS. 17A, 17B, 18 and 19 are examples of pool cleaning robots.

FIG. 17A is a cross sectional view of an example of of a pool cleaning robot 100 that has housing 80, opening 81, pump motor and impeller (not shown) that is rotated by the pump motor and causes a suction of the fluid and jet of fluid to be ejected from opening 82, filtering unit 170 such as a filter element (bag or cartridge) that is positioned in the housing.

The pool cleaning robot also includes a cleaning element such as an apertured bag 640. A flow of water and/or cleaning fluid through the apertured bag 640 may erect the apertured bag and cause jets of the water and/or cleaning fluid to exit the apertured bag through the apertures and clean the interior of filtering unit 170. Multiple nozzles or openings may be employed with varying nozzle or apertures diameters along the apertured bag. Debris and/or used water and/or cleaning fluid may exit the pool cleaning robot via opening 81. FIG. 17A also shows a valve 614 of the pool cleaning robot that is at an open position.

Calorimetric sensor 61 may not belong to the pool cleaning robot 100—and may inserted into pool cleaning robot 100 when the cleanliness of the filtering unit is tested.

Calorimetric sensor 61 may sense the cleanliness of the filtering unit and send information to controller 101 or to a controller of another entity (such as underwater system 5000 and/or external system 6000).

Calorimetric sensor 61 may be moved within the filtering unit by manipulator 658.

Figure 17B:
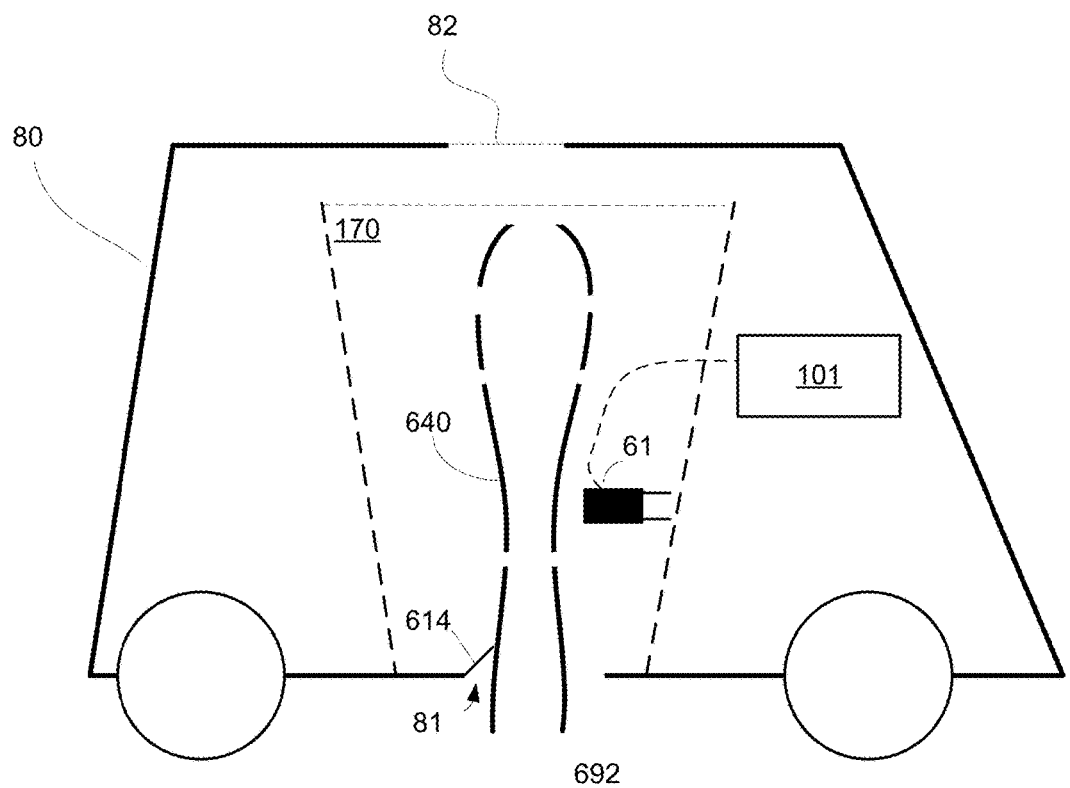

FIG. 17B is a cross sectional view of an example of of a pool cleaning robot 100. The pool cleaning robot of FIG. 17B differ from the pool cleaning robot of FIG. 17A by coupling the calorimetric sensor 61 to controller 101. The calorimetric sensor 61 belongs to the pool cleaning robot. No manipulator for moving the calorimetric sensor 61 is illustrated in FIG. 17B.

Figure 18:
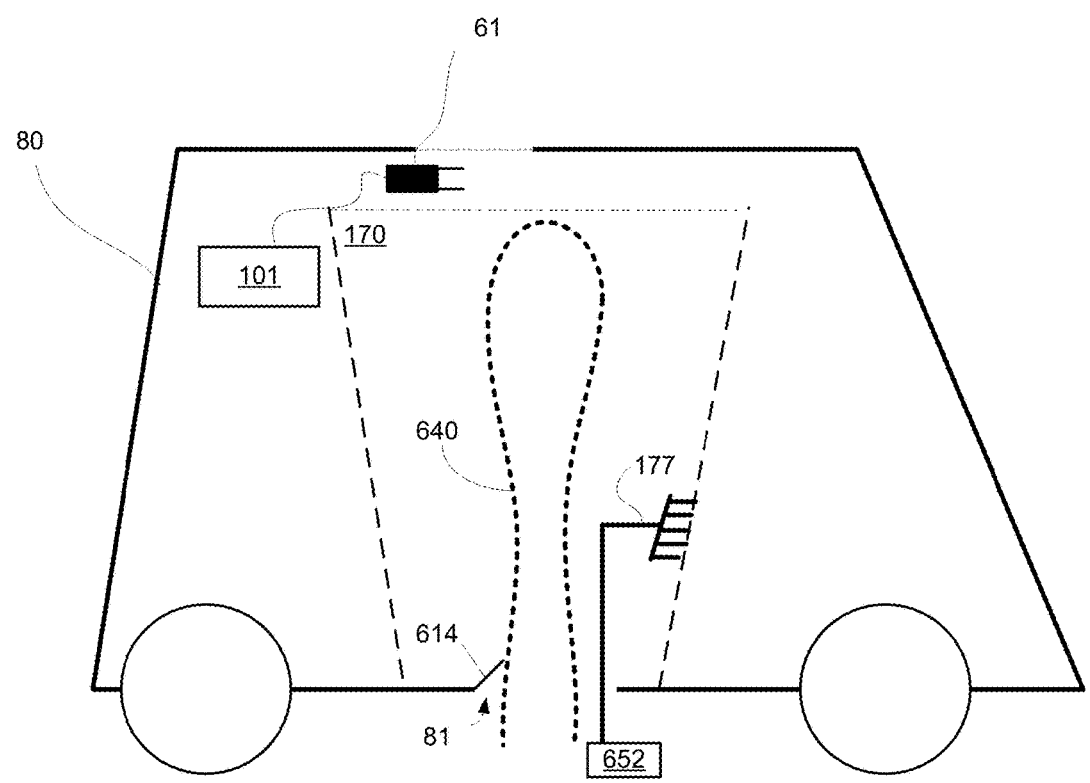

FIG. 17B is a cross sectional view of an example of a pool cleaning robot 100. The pool cleaning robot of FIG. 18 differ from the pool cleaning robot of FIG. 17A by positioning the calorimetric sensor 61 outside the filtering unit (and not inside the filtering unit—as shown in FIG. 17B), and by having an additional brushing elements 177 that may be moved by manipulator 652 and clean the filtering unit 170. The manipulator 652 and the brushing element 177 may not belong to the pool cleaning robot 100.

Figure 19:
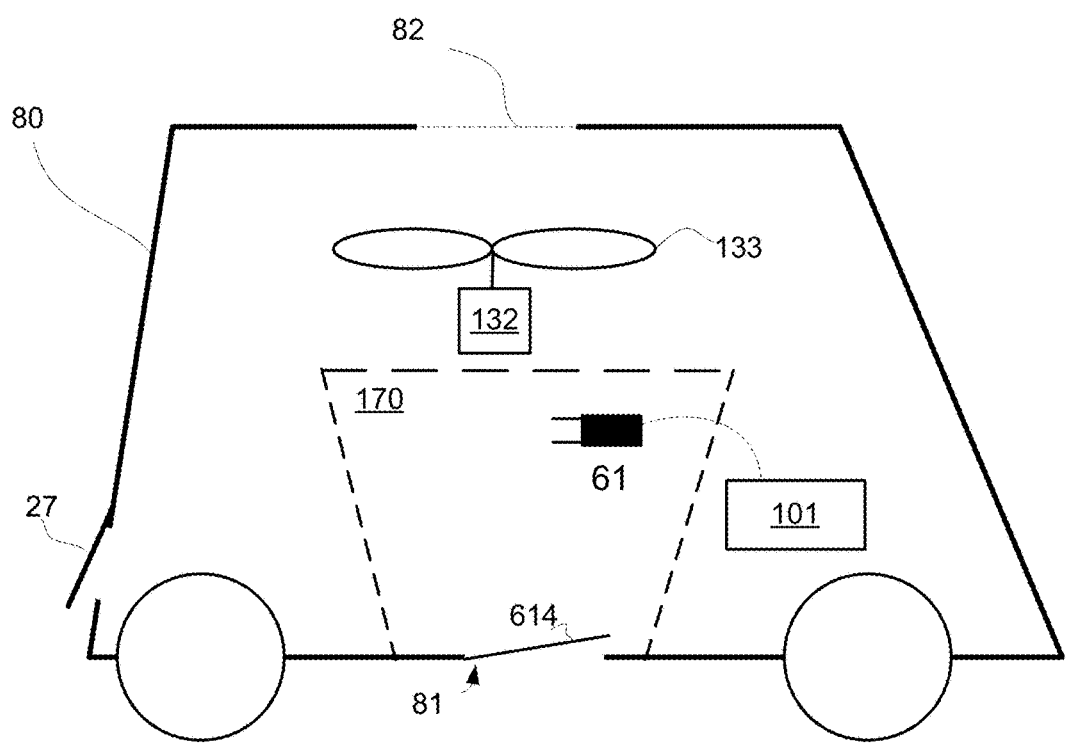

FIG. 19 is a cross sectional view of an example of of a pool cleaning robot 100 that has housing 80, opening 81, pump motor 132, impeller 133 that is rotated by the pump motor and causes a suction of the fluid and jet of fluid to be ejected from opening 82, filtering unit 170 such as a filter element (bag or cartridge) that is positioned in the housing valve 614 and rear door 27 formed at a rear part of housing 80. In FIG. 19 the valve 614 closes opening 81 and fluid may exit through rear door 27. This is used when the pool cleaning robot is being removed or exits the swimming pool.

Figure 20A:
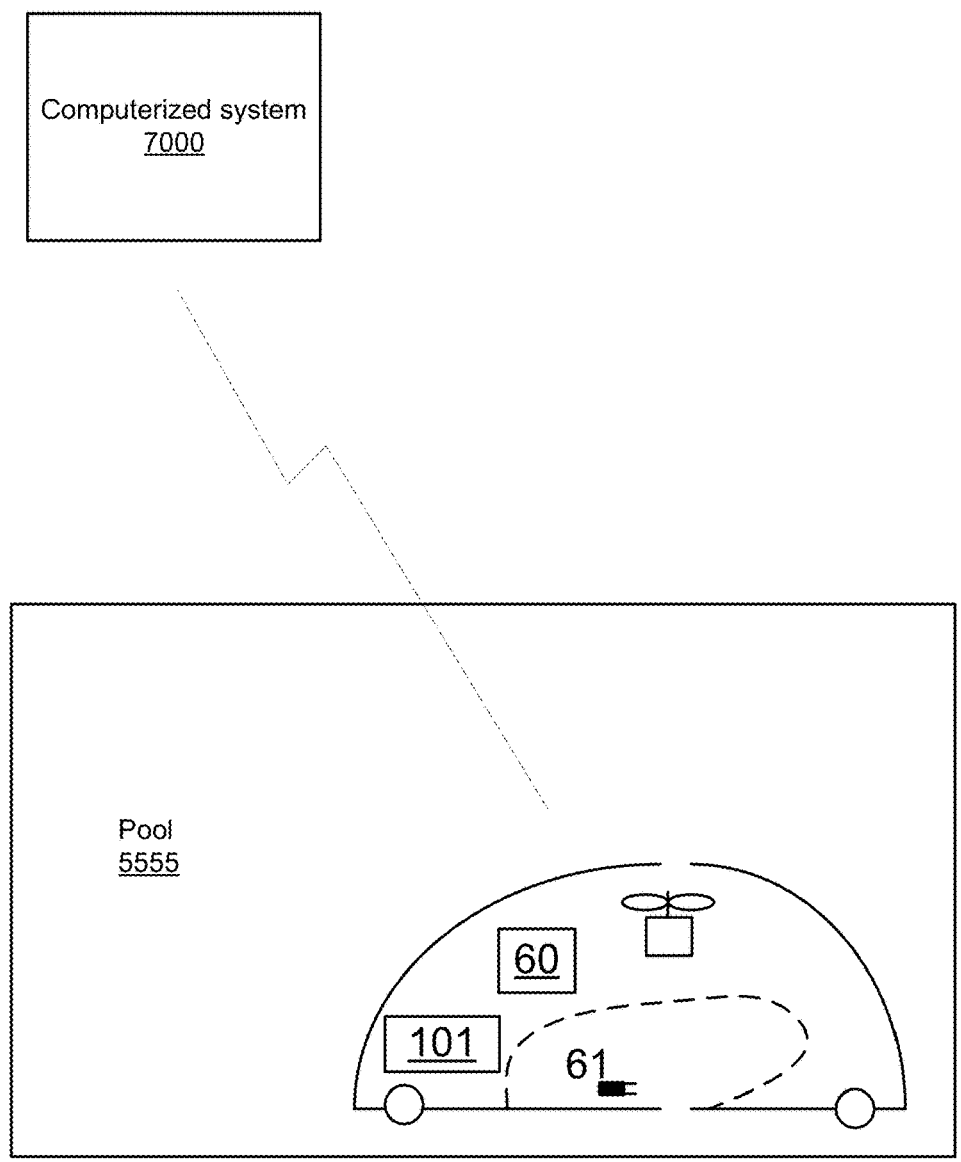
FIG. 20A is an example of a pool cleaning robot and a computerized system.

FIG. 20A illustrates an example of a computerized system 7000 and a pool cleaning robot 100 that includes calorimetric sensor 61, controller 101, filtering unit, impeller, pump motor, housing, openings and communication module 60.

Computerized system 7000 may be one or more computers, one or more servers, one or more mobile communication devices, or more smartphone, one or more tablet computer, more or more laptop computer, and the like.

Controller 101 may control the pool cleaning robot and may receive detection signals from calorimetric sensor 61. Controller 101 may determine the cleanliness of the filtering unit based on detection signals. Alternatively, the controller 101 may send the detection signals (either processed or "as is") to computerized system 7000 that may determine the cleanliness of the filtering unit based on the detection signals.

The computerized system 7000 may predict when the filter should be replaced, based, at least in part, on the cleanliness of the filtering unit or at least based on changes in the cleanliness of the filtering unit.

The computerized system 7000 may send alerts indicating that the filter is about to get clogged, when it is expected to become clogged, alerts indicating that the filtering unit should be replaced, alerts indicating the cleanliness level of the filtering, unit, and the like.

The computerized system 7000 may determine the cleanliness of the filter and instruct (or request) the pool cleaning robot to clean the filtering unit, to replace the filtering unit, and even may send the parameters of the cleaning process to the pool cleaning robot. Such messages may also be sent to an end user who will them remove the pool cleaning robot from the pool for servicing.

Figure 20B:
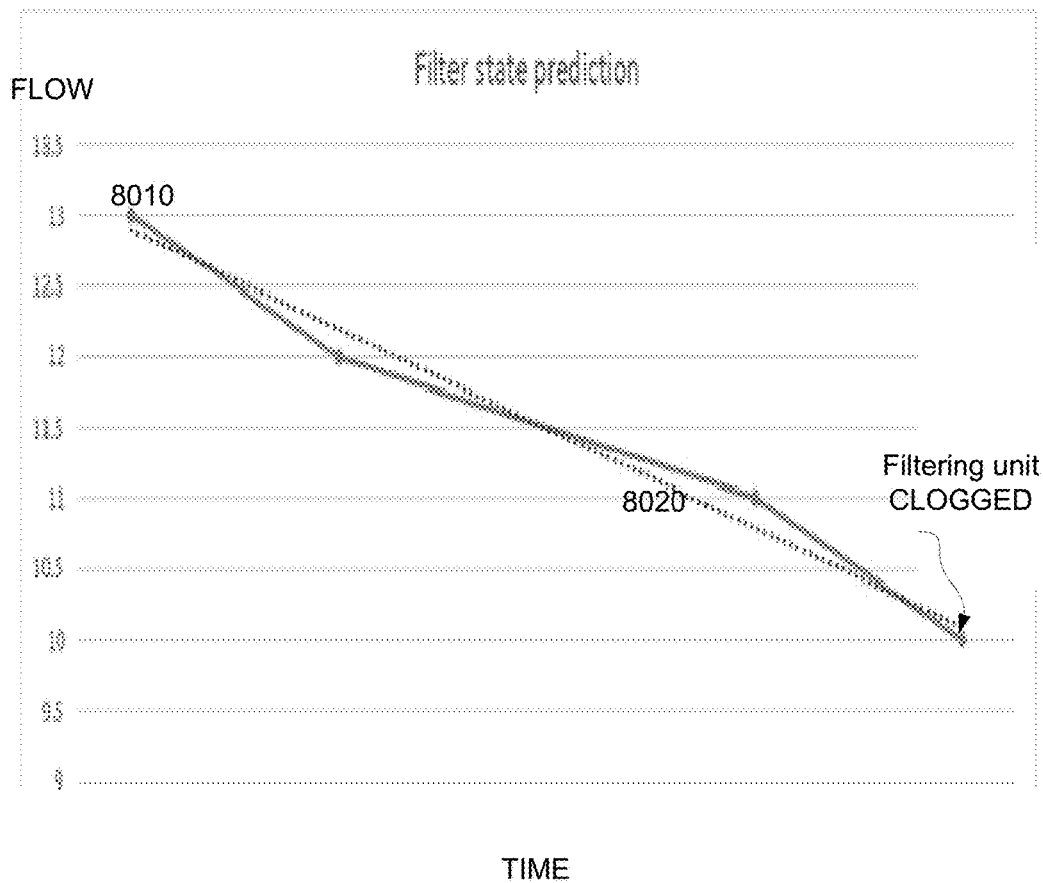
FIG. 20B is an example of a filter state prediction.

FIG. 20B illustrates different filter cleanliness readings (graph 8010) versus an expected cleanliness degradation pattern (graph 8020).

An expected point in time in which the filtering unit is clogged (to a predefined level) may be determined based on either one of the different filter cleanliness readings and the expected cleanliness degradation pattern.

It should be noted that the determination (or any estimate related to the cleanliness of the filter) may be also responsive to an expected pattern of operation of the pool cleaning robot—for example—the duration of each cleaning process, the repeatability of the cleaning process (one a week, once a day, few times a month), the time of the year (summer, winter, autumn, spring), and the like.

The determination (or any estimate related to the cleanliness of the filter) may be responsive to the flow changes through the filters, to the expected operation of the pool cleaning robot, to the cleaning patterns (concentrating on dirtier parts of the pool, random pattern), and the like.

The flow parameters may be monitored in a continuous or non-continuous manner. The intervals between one measurement to the other (in the non-continuous scenario) may be fixed, change over time, change in response to the cleanliness of the filter. May change in response to gaps between the actual cleanliness deterioration pattern and the expected cleanliness deterioration pattern, and the like. Greater gaps may require more monitoring.

The determination (or any estimate related to the cleanliness of the filter) may be executed by learning and/or updating in a continuous and/or non-continuous manner, one or more parameters such as (i) repeatability of the cleaning process, and (ii) the rate of cleanliness deterioration (accumulation of dirt) of the filtering unit.

Using the predetermined values of a fluid flow rate at different filtering unit states, for example, water flow through a clean filter will be about 17,000 liter per hour while a clogged filter will enable a flow of only about 10,000 liter per hour.

At least once in every operation cycle the robot will sample the fluid flow rate and keep the result.

The computerized system 7000 may perform an analysis of flow reading obtained from one or more pool cleaning robots during one or more periods of time and may calculate a trend line for a specific pool cleaning robot—and calculate the gradient of the trend line.

From the trend line and the gradient, the computerized system 700 may predict the expected time when the filter is subject to get fully clogged.

This predicted time will then be sent to the user and may also be stored as an event at the user's mobile device calendar.

It should be noted that the analysis, the mentioned above determination of the cleanliness of the filtering (or any estimate related to the cleanliness of the filter) may executed, in full or at least in part, by controller 101 and/or by a user computerized device. There may be provide a non-transitory computer readable medium that stores instructions for executing any method illustrated in the specification and/or any determination of the cleanliness of the filtering (or any estimate related to the cleanliness of the filter).

Figure 21:
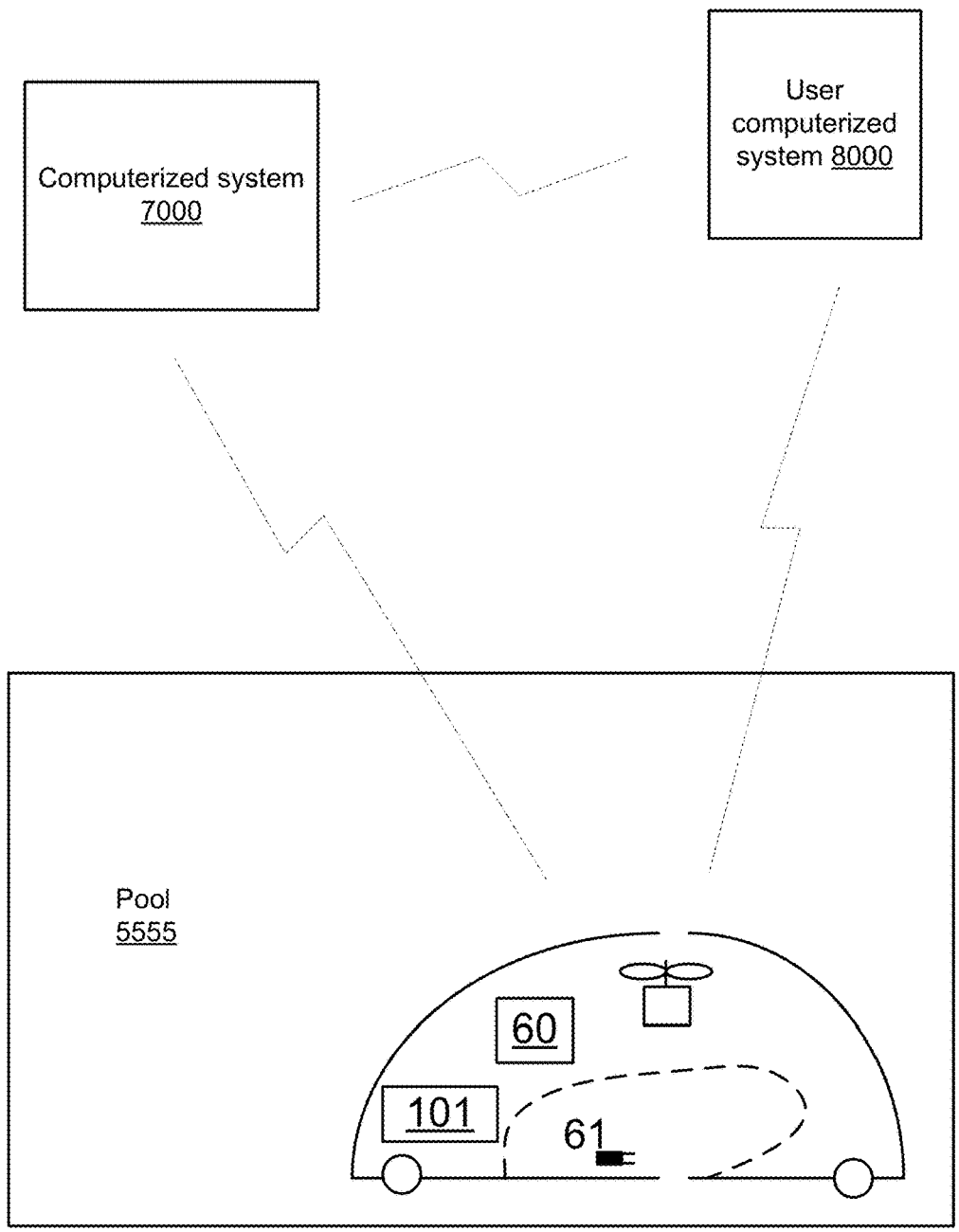
FIG. 21 is an example of a pool cleaning robot, a user computerized system and a computerized system.

FIG. 21 illustrates an example of a computerized system 7000, a user computerized system 8000 and a pool cleaning robot 100 that includes calorimetric sensor 61, controller 101, filtering unit, impeller, pump motor, housing, openings and communication module 60.

Computerized system 7000 may be one or more computers, one or more servers, one or more mobile communication devices, one or more smartphone, one or more tablet computer, one or more laptop computer, and the like. The user computerized system 8000 may be used or owned by the user of the pool cleaning robot. The user computerized system may be one or more computers, one or more servers, one or more mobile communication devices, one or more smartphone, one or more tablet computer, one or more laptop computer, and the like.

Controller 101 may control the pool cleaning robot and may receive detection signals from calorimetric sensor 61. Controller 101 may determine the cleanliness of the filtering unit based on detection signals. Alternatively, the controller 101 may send the detection signals (either processed or "as is") to computerized system 7000 that may determine the cleanliness of the filtering unit based on the detection signals.

The computerized system 7000 and/or the user computerized system may predict when the filter should be replaced, based, at least in part, on the cleanliness of the filtering unit or at least based on changes in the cleanliness of the filtering unit.

The computerized system 7000 and/or the user computerized system 8000 may send alerts indicating that the filter is about to get clogged, alerts indicating the cleanliness level of the filtering unit, alerts indicating when the filtering unit is going to be cleaned by the pool cleaning robot unit, alerts indicating when the filtering unit is going to be cleaned by an external system, alerts indicating when the filtering unit should be replaced or serviced, alerts indicating when the filtering unit is going to be cleaned by the pool cleaning robot and the like.

The computerized system 7000 and/or the user computerized system 800 may determine the cleanliness of the filter and instruct (or request) the pool cleaning robot to clean the filtering unit, to replace the filtering unit, and even may send the parameters of the cleaning process to the pool cleaning robot.

Figure 22:
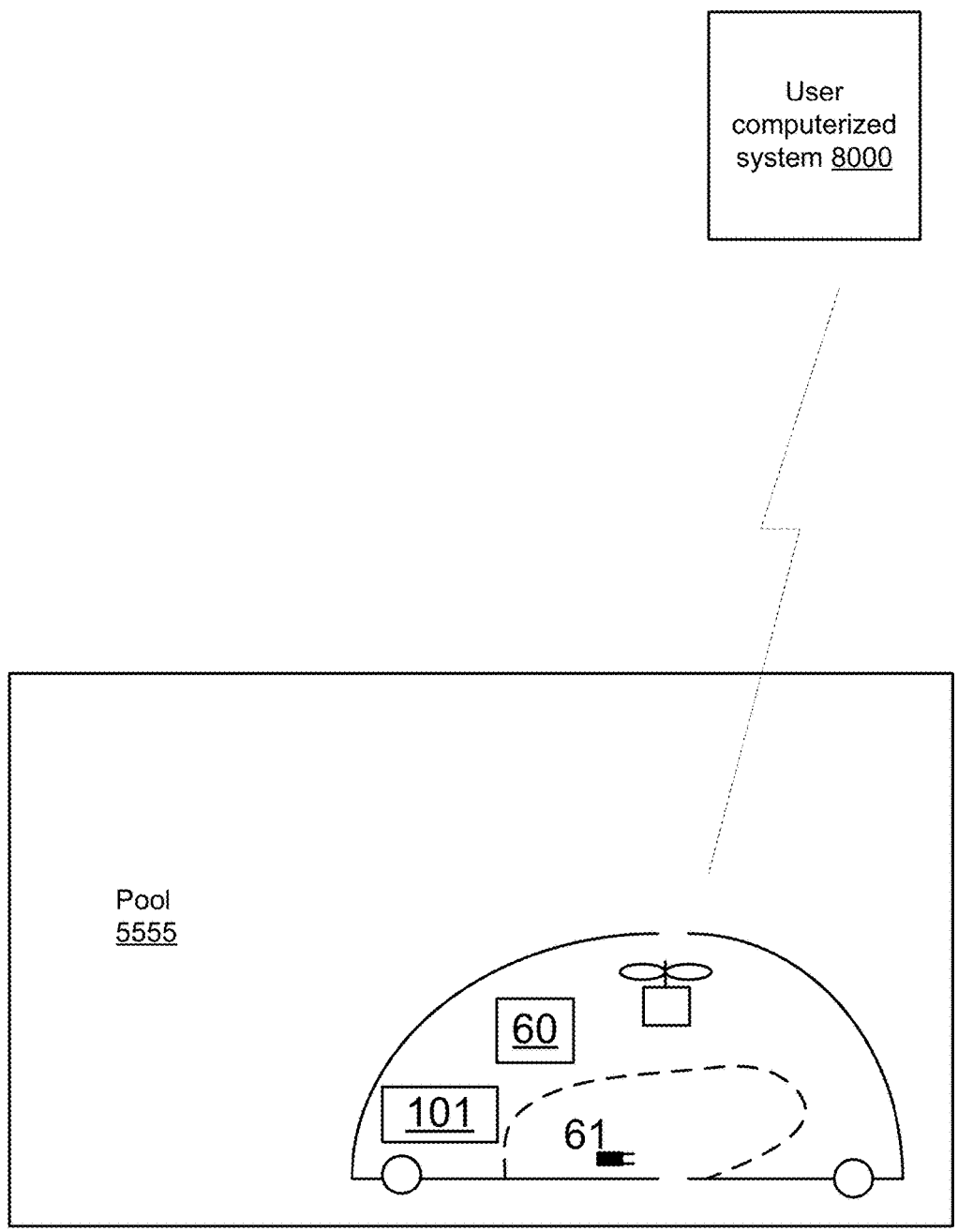
FIG. 22 is an example of a pool cleaning robot, a user computerized system.

FIG. 22 illustrates an example of a user computerized system 8000 and a pool cleaning robot 100 that includes calorimetric sensor 61, controller 101, filtering unit, impeller, pump motor, housing, openings and communication module 60.

FIG. 22 differs from FIG. 21 by not including the computerized system 7000. Any function of the computerized system 7000 may be executed by the user computerized system 8000 and/or the pool cleaning robot itself.

It should be noted that various components of the pool cleaning robot—such as a controller, electronic board, pump motor, battery, drive motor and the like may be located within one or more internal compartments/inner housings—thereby protecting these components from the fluid that flows in the pool cleaning robot.

Figure 23:
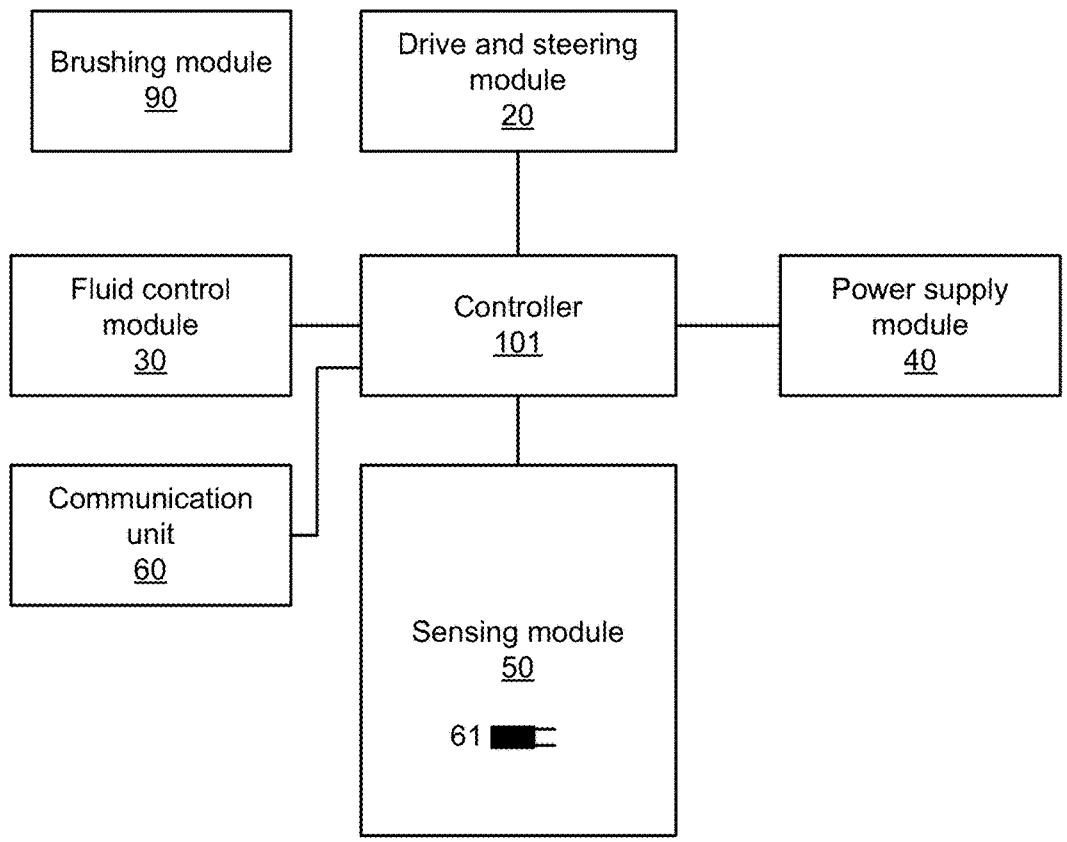
FIG. 23 is an example of a pool cleaning robot.

FIG. 23 illustrates various components of a pool cleaning robot 100.

The pool cleaning robot 100 is illustrated as including controller 101, drive and steering module 20, power supply module 40, fluid control module 30, sensing module 50 (including one or more calorimetric sensors such as calorimetric sensor 61), communication module 60 and brushing module 90.

The controller 101 is arranged to control the operation of the pool cleaning robot 100 and especially control the various modules 20, 30, 40, 50 and 60.

Figure 24:
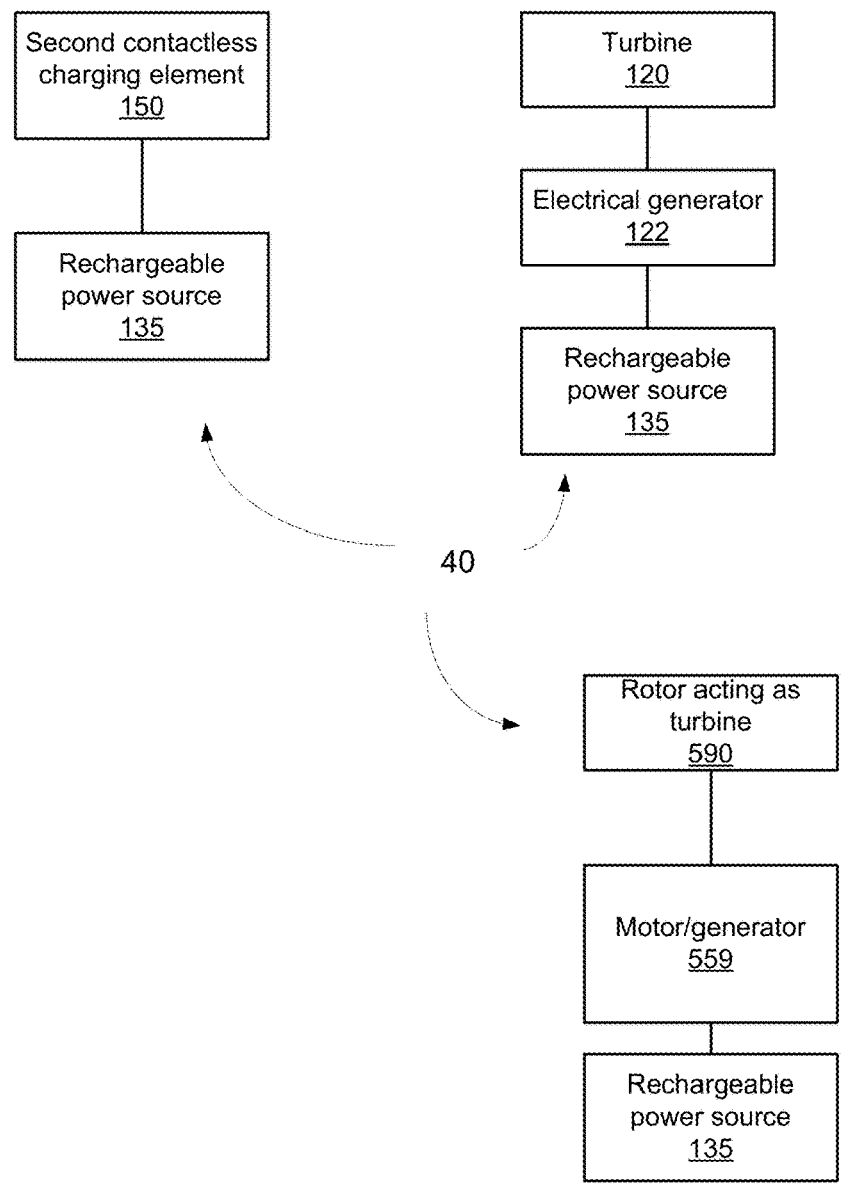
FIGS. 24-27 are examples of modules of the pool cleaning robot.

FIG. 24 illustrates power supply modules 40 of a pool cleaning robot 100 according to various embodiments of the invention.

The power supply module 40 is configured to provide electrical power to various power consuming components such as controller 101, motors, sensors, and the like. It may receive the electrical power or generate it.

One power supply module 40 includes a second contactless charging element 150 and a rechargeable power source 135.

Another power supply module 40 includes a turbine 120, electrical generator 122 and a rechargeable power source 135.

A further power supply module 40 includes a rotor 590 that acts as a turbine, a motor/generator 559 that acts as a generator and a rechargeable power source 135.

Figure 25:
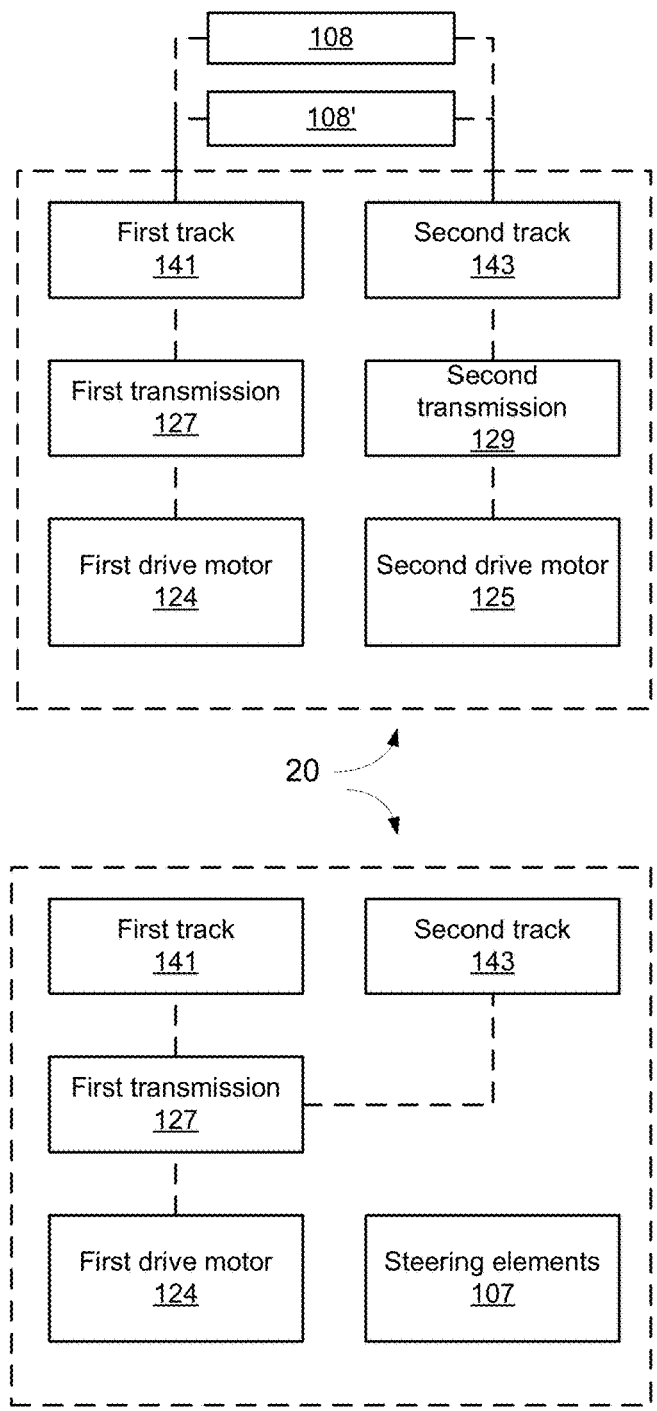

FIG. 25 illustrates drive and steering modules 20 of a pool cleaning robot 100 according to various embodiments of the invention.

Drive and steering module 20 is arranged to move the pool cleaning robot 100. It may include one or more motors, one or more wheels or tracks and one or more transmissions that convey movements introduced by motors to the one or more wheels and/or one or more tracks.

One drive and steering module 20 includes first drive motor 124, second drive motor 125, first transmission 127, second transmission 129, first track 141 and second track 143.

The pool cleaning robot 100 may include a brushing module (denoted 90 in FIG. 23) that may include one or more brushing wheels such as brushing wheels 108 that are rotated (directly or indirectly) by first and second tracks 141 and 143. The direction of movement of the pool cleaning robot 100 can be controlled by individually controlling the movement of first and second tracks 141 and 143.

Another drive and steering module 20 includes first drive motor 124, first transmission 127, first track 141, second track 143, brushing wheels (not shown) and steering elements 107. Steering elements 107 can include fins, imbalance introduction elements, controllable fluid jet elements and the like. Non-limiting examples of steering elements are provided in U.S. patent application Ser. No. 14/023,544 filed Sep. 11, 2013 which is incorporated herein by reference. Any other steering elements known in the art can be used.

Figure 26:
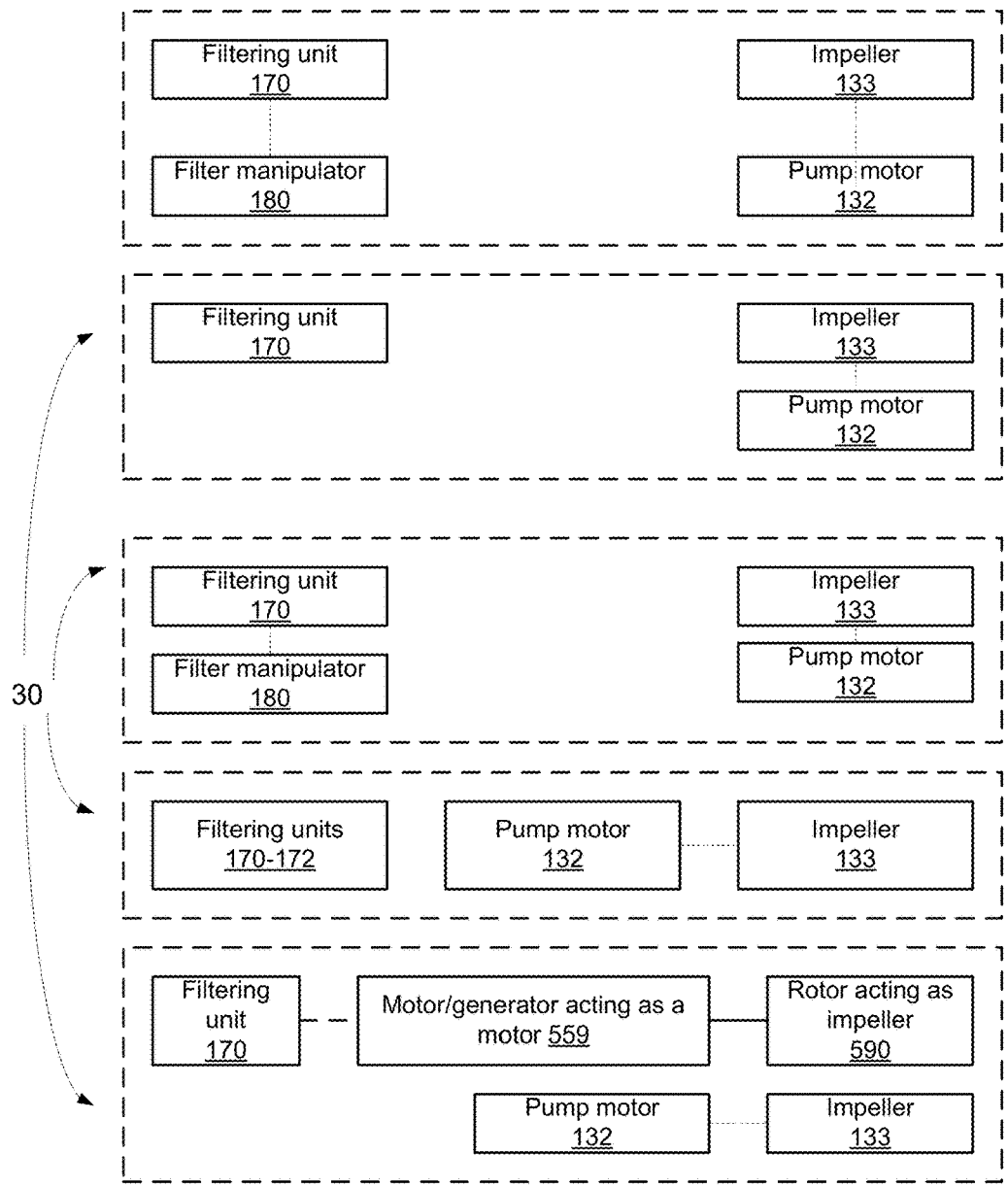

FIG. 26 illustrates fluid control modules 30 of a pool cleaning robot according to various embodiments of the invention.

A fluid control module 30 is arranged to control a flow of fluid within the pool cleaning robot and to filter said fluid.

It may include, any combination of the following:
a. Impeller 133 and pump motor 132 for inducing fluid to flow through the pool cleaning robot 100.
b. Rotor 590 that acts as an impeller and a motor/generator 559 that acts as a motor.
c. Filtering unit 170.
d. Filter manipulator 180.

Figure 27:
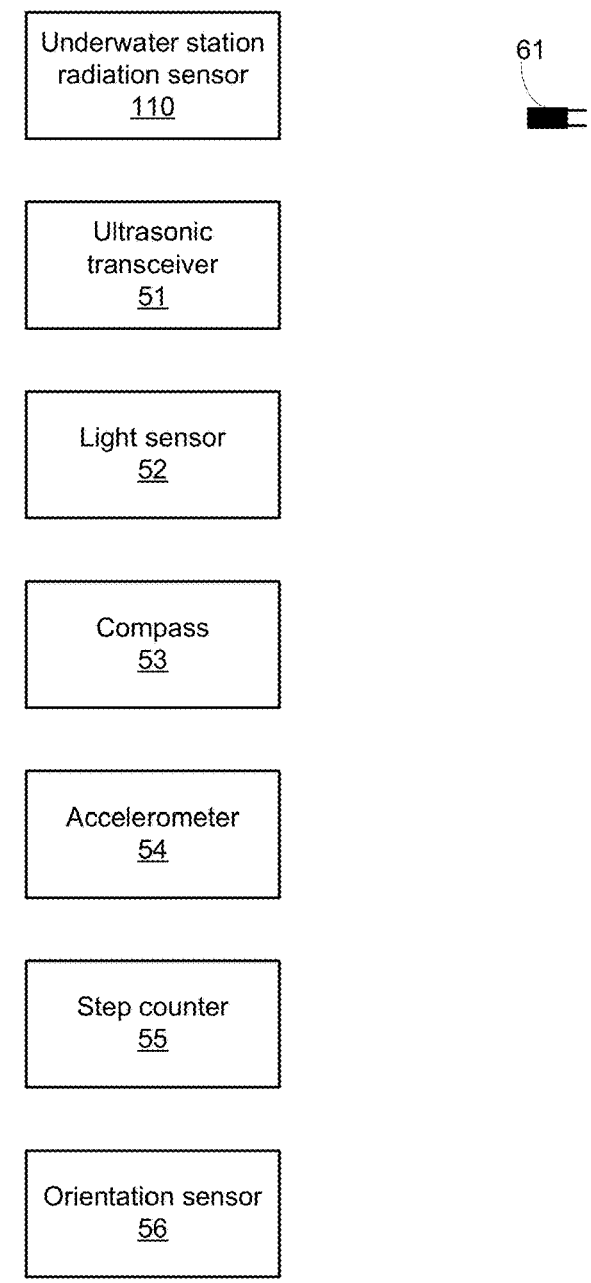

FIG. 27 illustrates sensors of a sensing module 50 of a pool cleaning robot according to various embodiments of the invention. The sensing module 50 may include one or more calorimetric sensors such as calorimetric sensor 61, and at least one other sensor out of:
a. Underwater station radiation sensor 110 for sensing radiation from an underwater station 5000—allowing the pool cleaning robot to navigate towards the underwater station.
b. Ultrasonic transceiver 51.
c. Acoustic sensor 52 that may include an acoustic emitter and an acoustic detector to provide information about the area of the pool the pool cleaning robot 100 is passing on.
d. Gyrocompass 53 or multiple gyrocompasses for providing directional information.
e. Accelerometer 54.
f. Step counter 55 for measuring movement of the pool cleaning robot.
g. Orientation sensor 56 for sensing the orientation of the pool cleaning robot 100.

Figure 28:
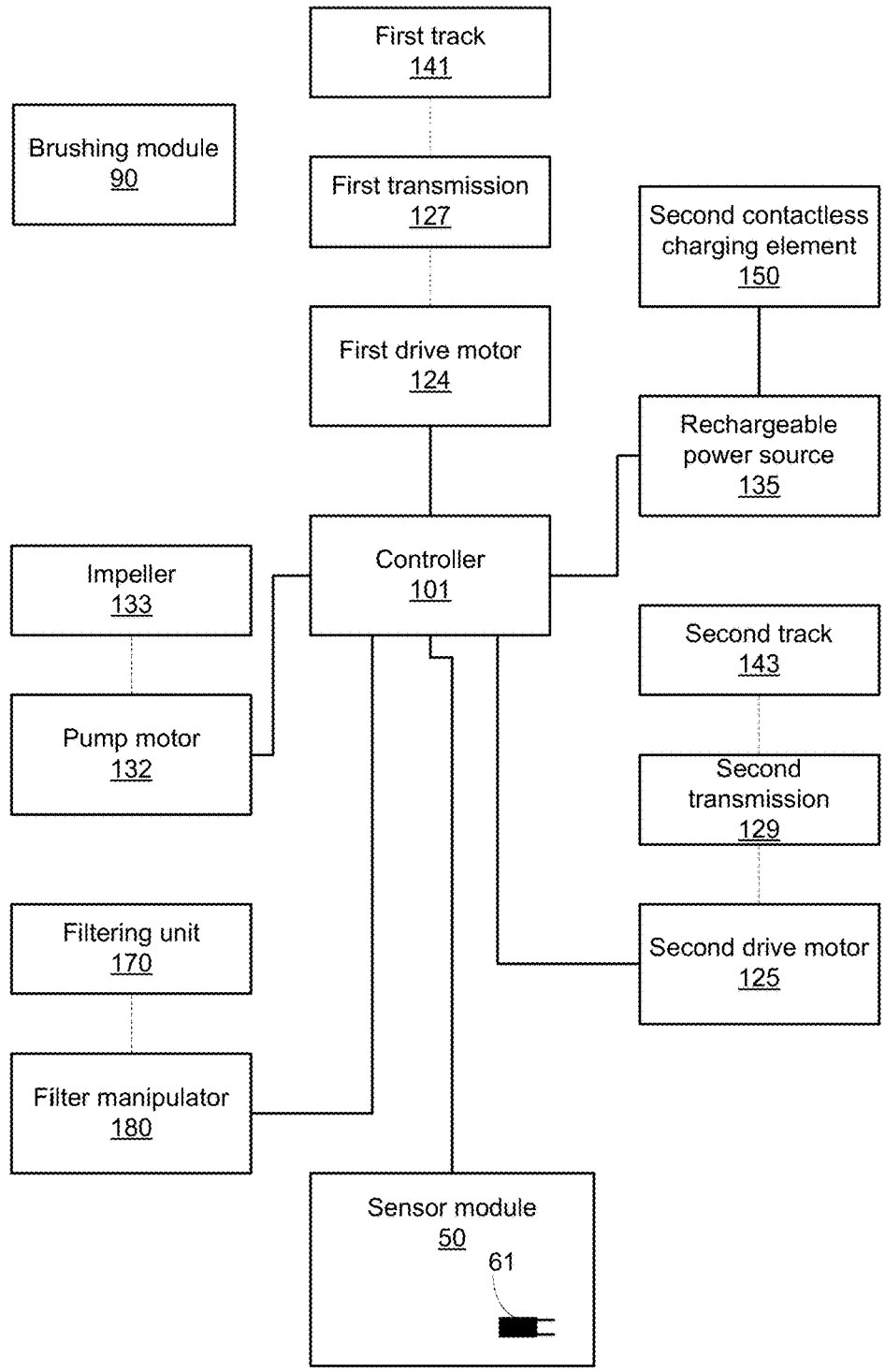
FIG. 28 is an example of a pool cleaning robot.

FIG. 28 illustrates various components of a pool cleaning robot 100. This is an example of combination of the drive 101 and various components of the drive and steering module 20, power supply module 40, fluid control module 30, sensing module 50 that includes one or more calorimetric sensors such as calorimetric sensor 61, communication module 60, and brushing module 90.

In FIG. 28 the pool cleaning robot 100 includes controller 101, sensing module 50 that includes one or more calorimetric sensors such as calorimetric sensor 61, communication module 60, filtering unit 170, filter manipulator 180, rechargeable power source 135, second contactless charging element 150, impeller 133, pump motor 132, first and second drive motors 124 and 125, first and second transmissions 127 and 129, first and second tracks 141 and 143.

Figure 29:
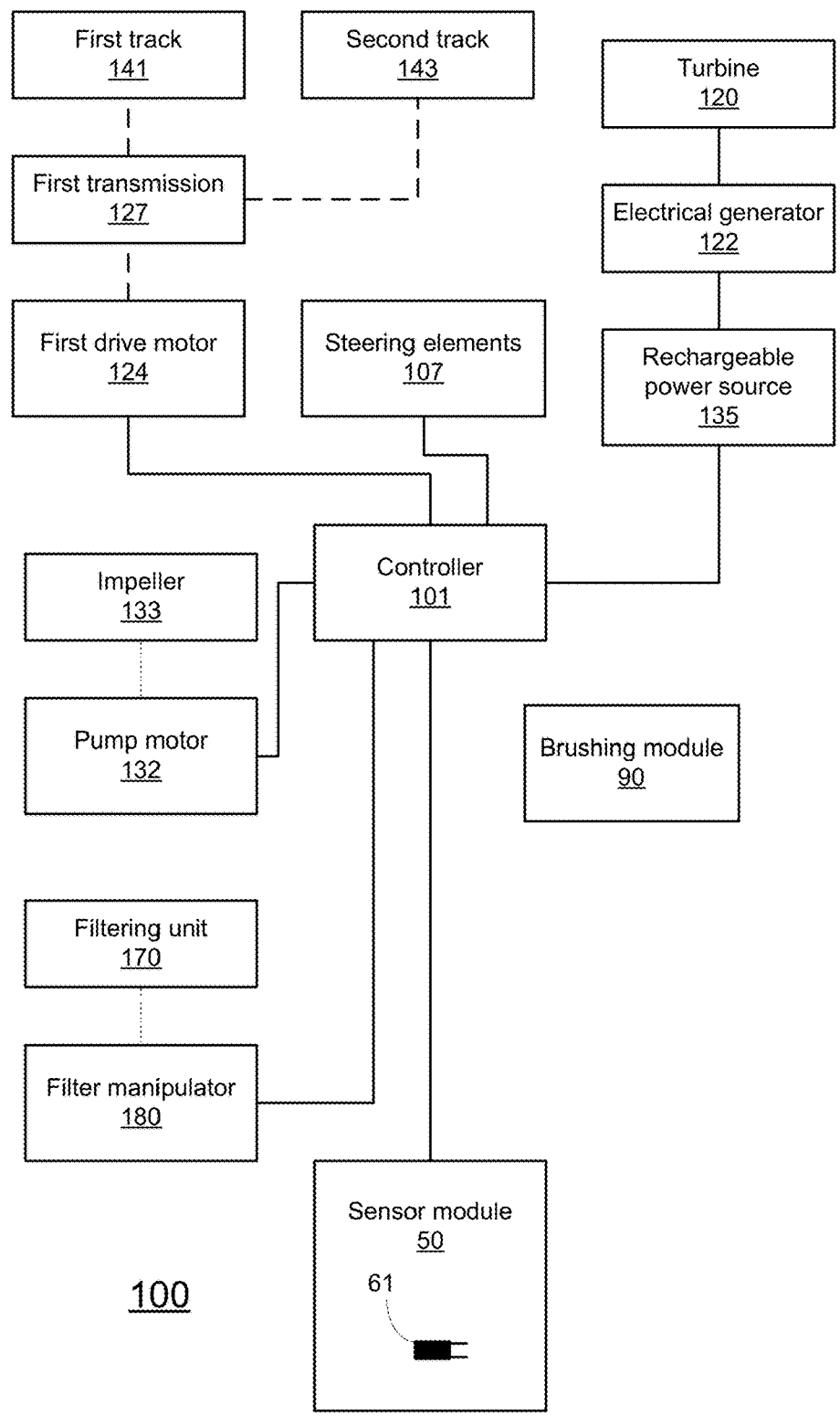
FIG. 29 is an example of a pool cleaning robot.

FIG. 29 illustrates various components of a pool cleaning robot 100.

In FIG. 29 the pool cleaning robot 100 includes controller 101, sensing module 50 that includes one or more calorimetric sensors such as calorimetric sensor 61, communication module 60, filtering unit 170, filter manipulator 180, rechargeable power source 135, electrical generator 122, turbine 120, impeller 133, pump motor 132, first drive motor 124, steering elements 107, first transmission 127, first and second tracks 141 and 143 and brushing module 90.

Any of the pool cleaning robots may have a shredder for shredding debris, a sanitizing unit for sanitizing the filtering unit, compression unit for compressing the filtering unit, spare filtering units for replacing the filtering unit, and the like.

Detection signals from a calorimetric sensor are processed to determine a flow of fluid. The flow of fluid is processed to determine a cleanliness of a filtering unit.

Figure 30:
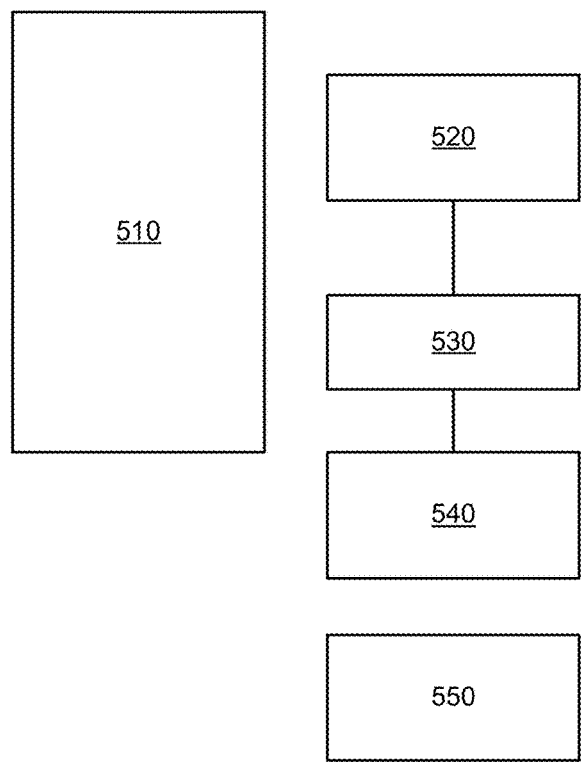
FIG. 30 is an example of a method.

FIG. 30 illustrates method 500 according to an embodiment of the invention.

Method 500 includes the following steps:

Step 510 of filtering, by a filtering unit of the pool cleaning robot, fluid that passes through the filtering unit.

Step 520 of sensing, by a calorimetric sensor, a cleanliness related parameter of the filtering unit while the pool cleaning robot is submerged in the fluid.

The sensing may be executed in a continuous or non-continuous manner.

The sensing may occur during an entire sensing period or during a part of a filtering period.

The cleanliness related parameter of the filtering unit may be a flow of fluid that is forced to flow through the filtering unit.

The measurement of the calorimetric sensor may be influenced by various parameters such as the temperature of the fluid within a pool and/or a movement of the pool cleaning robot itself.

The flow may increase when the pool cleaning robot moves.

The temperature of the fluid in the pool may be measured (directly or indirectly) when the pool cleaning robot is not pumping fluid and is static.

Alternatively—the flow calculation may take into account the difference between the reading of the calorimetric sensor when the pool cleaning pumps fluid versus the readings when the pool cleaning sensor is not pumping fluids.

Yet for another example—impeller parameters (such as speed) and/or movement parameters of the pool cleaner may be taken into account.

The sensing may be executed by multiple calorimetric sensors.

The sensing may involve sensing a flow of fluid inside the pool cleaning robot and/or the flow of fluid outside the pool cleaning robot.

Step 530 of assisting in determining, by a controller of the pool cleaning robot and based on the cleanliness related parameter of the filtering unit, a cleanliness of the filtering unit.

Step 530 may include at least one of the following:
a. Determining, based on the cleanliness related parameter of the filtering unit, the cleanliness of the filtering unit.
b. Determining, by co-operating with another computerized system or component, the cleanliness of the filtering.
c. Predicting, based on the cleanliness related parameter of the filtering unit, when the filtering unit will be clogged.
d. Predicting, by co-operating with another computerized system or component, based on the cleanliness related parameter of the filtering unit, when the filtering unit will be clogged.

The method may include step 540 of exchanging information between the pool cleaning robot and another entity—or at least transmitting information from the pool cleaning robot.

Step 540 may include transmitting by a communication unit information about the cleanliness related parameter of the filtering unit to a computerized system that is external to the pool cleaning robot. Any alert or notification may be sent to a computerized system to a user, and the like.

Step 540 may include receiving by the communication unit information about the cleanliness of the filtering unit, and sending the information about the cleanliness of the filtering unit to the controller.

Method 500 may also include step 550 of triggering and/or performing a cleaning operation of the filtering unit.

It should be noted that the cleaning operation may be triggered based on the cleanliness of the filtering unit—and that cleaning process may include reversing the rotational direction of the impeller so that fluid is forced to enter through opening 82 and exit through opening 81 to perform a backwashing operation.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a pool cleaning robot as including a certain component should also cover the scenario in which the pool cleaning robot does not include the certain component. For example—any reference to a method as including a certain step should also cover the scenario in which the method does not include the certain component. Yet for another example—any reference to a pool cleaning robot that is configured to perform a certain operation should also cover the scenario in which the pool cleaning robot is not configured to perform the certain operation.

The terms "pool cleaner" and "pool cleaning robot" are used in an autonomous manner and may refer to a self-propelled pool cleaner.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of pool cleaning robot that is illustrated in any of the figures and/or specification and/or the claims may be provided.

Any combination of any pool cleaning robot illustrated in any of the figures and/or specification and/or the claims may be provided.

Any combination of any set of pool cleaning robots illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

We claim:

1. A pool cleaning robot, comprising:
a filtering unit for filtering fluid that passes through the filtering unit;
a calorimetric sensor for sensing a cleanliness related parameter of the filtering unit while the pool cleaning robot is submerged in the fluid;
wherein the cleanliness related parameter of the filtering unit is a flow of fluid that is forced to flow through the filtering unit; and
a controller that is configured to at least assist in determining, based on the cleanliness related parameter of the filtering unit, a cleanliness of the filtering unit.

2. The pool cleaning robot according to claim 1, wherein the controller is configured to determine, based on the cleanliness related parameter of the filtering unit, the cleanliness of the filtering unit.

3. The pool cleaning robot according to claim 1 comprising multiple calorimetric sensors for sensing the cleanliness related parameter of the filtering unit while the pool cleaning robot is submerged in the fluid.

4. The pool cleaning robot according to claim 1, wherein at least a part of the calorimetric sensor is positioned within the filtering unit.

5. The pool cleaning robot according to claim 1, wherein at least a part of the calorimetric sensor is positioned within the pool cleaning robot but outside the filtering unit.

6. The pool cleaning robot according to claim 1, wherein at least a part of the calorimetric sensor extends outside a housing of the pool cleaning robot.

7. The pool cleaning robot according to claim 1, wherein a sensing end of the calorimetric sensor is located at substantially a same level as a bottom of the housing of the pool cleaning robot.

8. The pool cleaning robot according to claim 1 comprising a cleaning element that precedes a sensing end of the calorimetric sensor.

9. The pool cleaning robot according to claim 1, wherein the calorimetric sensor is incorporated into the pool cleaning robot motor unit.

10. The pool cleaning robot according to claim 1, wherein the controller is configured to predict, based on the cleanliness related parameter of the filtering unit, when the filtering unit will be clogged.

11. The pool cleaning robot according to claim 1, wherein the controller is configured to predict when the filtering unit will be clogged, based on successive updating of filtering unit filling rate parameters.

12. The pool cleaning robot according to claim 1, wherein the controller is configured to predict when the filtering unit will be clogged, based on a rate of initiation of new cleaning cycles.

13. The pool cleaning robot according to claim 1, wherein the controller is configured to predict when the filtering unit will be clogged, based on successive updating of filtering unit filling rate parameters and on a rate of initiation of new cleaning cycles.

14. A pool cleaning robot, comprising:
a filtering unit for filtering fluid that passes through the filtering unit;
a calorimetric sensor for sensing a cleanliness related parameter of the filtering unit while the pool cleaning robot is submerged in the fluid;

a controller that is configured to at least assist in determining, based on the cleanliness related parameter of the filtering unit, a cleanliness of the filtering unit; and a communication unit that is configured to transmit information about the cleanliness related parameter of the filtering unit to a computerized system that is external to the pool cleaning robot.

15. The pool cleaning robot according to claim 14, wherein the communication unit is configured to receive information about the cleanliness of the filtering unit and to send the information about the cleanliness of the filtering unit to the controller.

16. The pool cleaning robot according to claim 15, wherein the communication unit is configured to receive information and to send the information predicting the cleanliness of the filtering unit to the controller.

17. A method for monitoring a pool cleaning robot, the method comprises:

filtering, by a filtering unit of the pool cleaning robot, fluid that passes through the filtering unit;

sensing, by a calorimetric sensor, a cleanliness related parameter of the filtering unit while the pool cleaning robot is submerged in the fluid;

assisting in determining, by a controller of the pool cleaning robot and based on the cleanliness related parameter of the filtering unit, a cleanliness of the filtering unit; and determining, based on the cleanliness related parameter of the filtering unit, the cleanliness of the filtering unit.

18. The method according to claim 17, wherein the cleanliness related parameter of the filtering unit is a flow of fluid that is forced to flow through the filtering unit.

19. The method according to claim 17, comprising predicting, based on the cleanliness related parameter of the filtering unit, when the filtering unit will be clogged.

20. The method according to claim 17, comprising transmitting by a communication unit information about the cleanliness related parameter of the filtering unit to a computerized system that is external to the pool cleaning robot.

* * * * *